United States Patent [19]
Arai et al.

[11] Patent Number: 5,867,355
[45] Date of Patent: Feb. 2, 1999

[54] RECORDING AND/OR REPRODUCING APPARATUS WITH EXTERNAL CONTROLLER AND HEADSET AND SEPARATE TAKE-UP REELS THEREFOR

[75] Inventors: Toshio Arai, Tokyo; Mitsuru Ida, Saitama; Kazutaka Nakashima, Chiba, all of Japan

[73] Assignee: Sony Corporation, Tokyo, Japan

[21] Appl. No.: 562,048

[22] Filed: Nov. 22, 1995

[51] Int. Cl.⁶ ................................................ G11B 33/00
[52] U.S. Cl. ...................... 360/137; 381/187; 360/96.6
[58] Field of Search ........................... 360/137; 381/187; 455/90

[56] References Cited

U.S. PATENT DOCUMENTS

| | | | |
|---|---|---|---|
| 5,201,003 | 4/1993 | Pavel | 381/25 |
| 5,339,461 | 8/1994 | Luplow | 455/351 |
| 5,420,739 | 5/1995 | Yokozawa et al. | 360/137 |
| 5,422,957 | 6/1995 | Cummins | 381/183 |
| 5,453,585 | 9/1995 | Lenz et al. | 191/12.2 R |

FOREIGN PATENT DOCUMENTS

| | | |
|---|---|---|
| 0300395A2 | 1/1989 | European Pat. Off. |
| 0350269A2 | 1/1990 | European Pat. Off. |
| 0355309A2 | 2/1990 | European Pat. Off. |
| 0371273 | 6/1990 | European Pat. Off. |
| 0709850 | 5/1996 | European Pat. Off. |

OTHER PUBLICATIONS

Abstract for JP 63-217589, from Section P, No. 811, Vol. 13, No. 9, p. 160 (Jan. 11, 1989).
Abstract for JP 63-204582, from Section P, No. 805, Vol. 12, No. 494, p. 81 (Dec. 23, 1988).

*Primary Examiner*—Jefferson Evans
*Attorney, Agent, or Firm*—Jay H. Maioli

[57] ABSTRACT

A recording and/or reproducing apparatus for a recording medium, such as a magnetic tape, includes a recording and/or reproducing unit, a main body portion, a signal line and a take-up mechanism. The main body portion houses the recording and/or reproducing unit. The external equipment includes an input unit for entering a signal for setting the operating mode of the recording and/or reproducing unit and an electro-acoustic transducer for converting signals from the recording and/or reproducing unit into audible sound. The external equipment may be attached to and detached from the main body portion and exchanges signals with the recording and/or reproducing unit. The signal line interconnects the external equipment and the recording and/or reproducing unit. The signal line has its one end connected to the external equipment and its other end connected to a circuit board housed within the main body portion for exchanging information signals with the recording and/or reproducing unit. The take-up mechanism takes up the signal line and houses it within the main body portion. The take-up mechanism is arranged on the circuit board within the main body portion.

7 Claims, 22 Drawing Sheets

RECORDING AND/OR REPRODUCING APPARATUS WITH EXTERNAL CONTROLLER AND HEADSET AND SEPARATE TAKE-UP REELS THEREFOR

BACKGROUND

1. Field of the Invention

This invention relates to a recording and/or reproducing apparatus. More particularly, it relates to a recording and/or reproducing apparatus having a cord take-up function.

2. Background of the Invention

Among the various kinds of recording and/or reproducing apparatus, there are a recording and/or reproducing apparatus employing a tape-shaped recording medium, such as a magnetic tape, and a recording and/or reproducing apparatus employing a disc-shaped recording medium, such as an optical disc.

Among these recording and/or reproducing apparatus, there is such an apparatus having a recording and/or reproducing unit housed within its main body portion and a remote controller operating as an external equipment for entering and supplying switching signals for switching between the operating modes via a signal cable to the recording and/or reproducing unit.

The recording and/or reproducing unit has a loader for a recording medium, such as a tape cassette or a disc cartridge, and a head device, such as an optical pickup unit or a magnetic head.

The remote control unit generates an operating signal in keeping with a manual operation for supplying the operating signal via a signal cable to the recording and/or reproducing unit. The recording and/or reproducing unit is responsive to the supplied operating signal to switch between recording, reproduction, music number selection and stop and to execute the selected operation.

The acoustic signals outputted by the recording and/or reproducing unit are converted into audible signals by an electro-acoustic transducer (headphone device) constituting an external equipment connected to the recording and/or reproducing unit over a signal cable.

The signal cable interconnecting the recording and/or reproducing unit and the remote controller and the signal cable interconnecting the recording and/or reproducing unit and the headphone device are combined into one cable, and the above-mentioned remote controller is provided at a mid portion of the signal cable interconnecting the recording and/or reproducing unit and the headphone device.

Among these recording and/or reproducing apparatus, there is such an apparatus in which an end portion of the signal cable interconnecting the recording and/or reproducing unit and the headphone device, which is to be connected to the main body portion, is connected to a brush-shaped electrode part provided in a cable reel. This brush-shaped electrode part is configured for being in sliding contact with the electrode part of the recording and/or reproducing unit within the main body portion.

The end portion of the signal cable is soldered to the brush-shaped electrode part of the cable reel after the cable reel has been rotatably mounted within the main body portion.

Since the cable reel has already been assembled within the main body portion, and the portion of the brush-shaped electrode part connected to the signal cable is in the hub portion at the center of the cable reel, the operation of soldering the end portion of the signal to the brush-shaped electrode part is a laborious and painstaking operation. That is, with the soldering operation, it is extremely difficult to execute the operation in a short period of time while maintaining electrical and mechanical reliability.

With the recording and/or reproducing apparatus, a reel support shaft for rotatably supporting the cable reel is supported by a supporting member which is distinct from the printed board carrying an electrode part configured for being contacted by the brush-shaped electrode part. Thus, the printed board and the supporting member are arranged in a layered fashion in the vicinity of the cable reel thus, thereby complicating and enlarging the size of the apparatus.

SUMMARY OF THE INVENTION

It is therefore an object of the present invention to provide a recording and/or reproducing apparatus which solves the above-mentioned problems.

According to the present invention, there is provided a recording and/or reproducing apparatus including recording and/or reproducing means, a main body portion housing the recording and/or reproducing means, an external equipment for exchanging signals with the recording and/or reproducing means, and linear connection means interconnecting the external equipment and the recording and/or reproducing means. The linear connection means has one end connected to the external equipment and the other end connected to a circuit board housed within the main body portion for exchanging signals with the recording and/or reproducing means. The recording and/or reproducing apparatus also includes take-up means arranged on the circuit board within the main body portion for taking up the connection means and for housing the connection means thus taken up in the main body portion.

According to the present invention, there is also provided a recording and/or reproducing apparatus including recording and/or reproducing means, a main body portion housing the recording and/or reproducing means, and an external equipment for exchanging signals with the recording and/or reproducing means. The external equipment has output means for outputting signals from the recording and/or reproducing means. The recording and/or reproducing apparatus also includes first linear connection means for supplying signals to the output means, first take-up means for taking up the first linear connection mean, and second linear connection means interconnecting the external equipment and the recording and/or reproducing means. The second linear connection means has an end connected to the external equipment and has the other end connected to a circuit board housed within the main body portion for exchanging signals with the recording and/or reproducing means. The recording and/or reproducing apparatus also has second take-up means arranged on the circuit board within the main body portion for taking up the second connection means for housing the connection means thus taken up in the main body portion.

DESCRIPTION OF THE INVENTION

Figure 1:
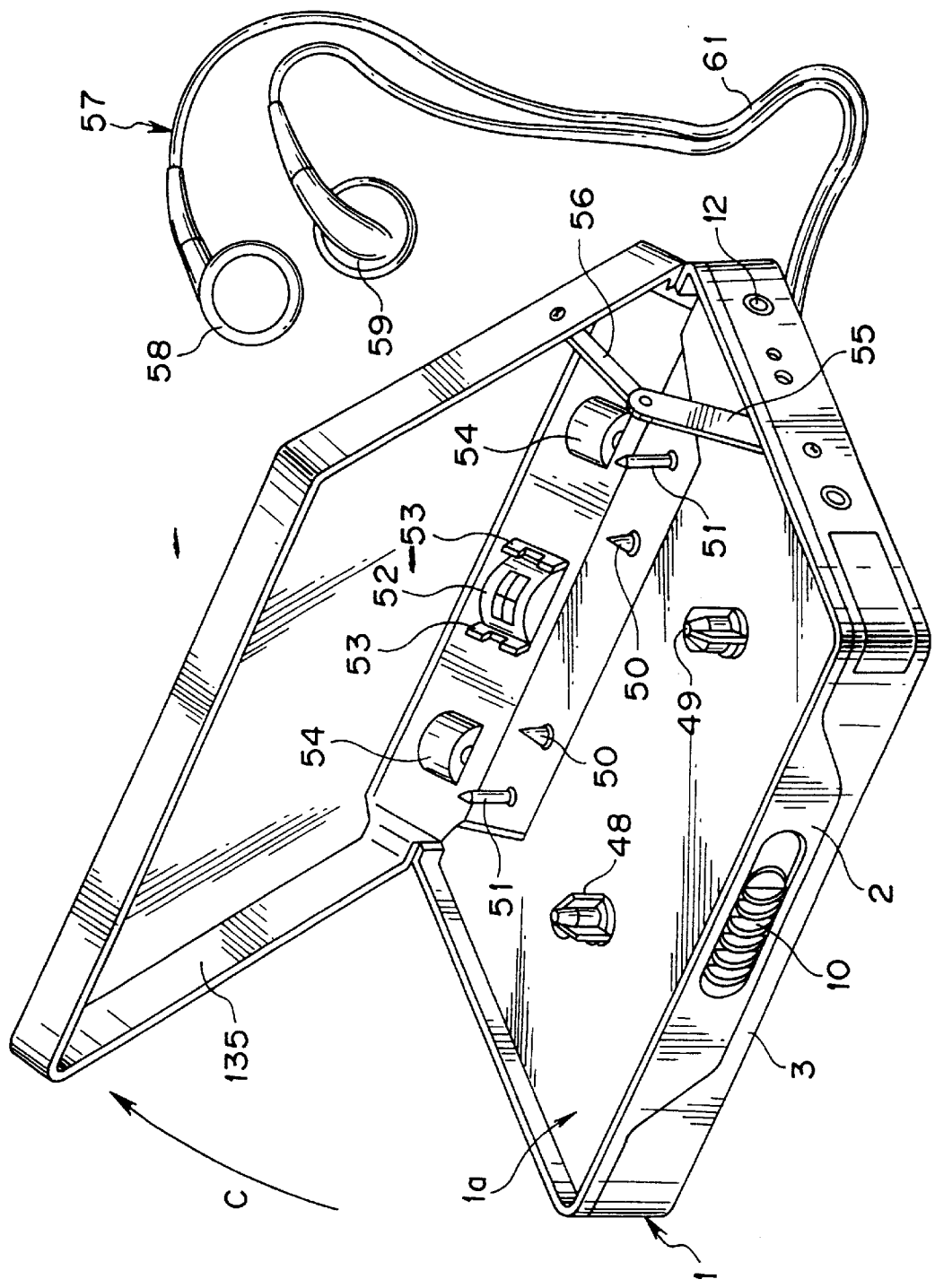
FIG. 1 is a perspective view showing a tape player device according to an embodiment of the present invention.

Referring to the drawings, a recording and/or reproducing apparatus according to the present invention will be explained in detail.

The following description is made with reference to a tape player device for reproducing information signals recorded on a tape cassette which is taken as an example of the recording and/or reproducing apparatus embodying the present invention. The tape player device of the preferred embodiment of the present invention is explained in the following sequence:

[1] Main Body Portion
[2] Remote Controller
[3] Clip for Electronic Equipment
[4] First Cable Reel
[5] Headphone
[6] Signal Cable
[7] Second Cable Reel
[8] Holder for Remote Controller
[9] Headphone Holder
[10] Operation of Tape Player

[1] Main Body Portion

The tape player device has a main body portion 1, as shown in FIG. 1. This main body portion 1 has an outer casing comprised of a chassis 2, a front panel 3 mounted on the front side of the chassis 2 and a cassette lid 135 mounted on the back side of the chassis 2.

The cassette lid 135 is pivotally mounted on one lateral side thereof on the chassis 2 for rotation between a position of closing the spacing between the chassis 2 and the cassette lid 135, that is closing a cassette housing, and a position of clearing the chassis 2 for opening the cassette housing. That is, the cassette lid 135 is mounted on the main body portion 1 for being opened in a direction as shown by arrow C in FIG. 1.

The cassette lid 135 is locked at a position of being abutted against the chassis 2 by a lid lock mechanism, not shown, provided within the chassis 2. On actuation of a lock canceling lever 10 provided on the chassis 2, the locking of the cassette lid 135 by the lid lock mechanism is canceled so that the cassette lid 135 may be rotated in a direction shown by arrow C in FIG. 1.

An electronic circuit board, not shown, constituting a recording and/or reproducing unit, is mounted on the chassis 2 and housed in this state between the chassis 2 and the front panel 3 within the main body portion 1.

The spacing between the chassis 2 and the cassette lid 135 represents the tape cassette housing 1a, as mentioned previously. On the rear side of the chassis 2 are mounted a pair of reel driving shafts 48, 49 of the recording and/or reproducing apparatus for being protruded into the inside of the tape cassette housing 1a. These reel driving shafts 48, 49 are run in rotation by a motor arranged within the chassis 2 and are engaged with a pair of tape reels of the tape cassette, not shown, loaded on the tape cassette housing 1a, for running the tape reels in rotation.

On the rear side of the chassis 2 are arranged a pair of capstan shafts 51, 51 and a pair of cassette positioning pins 50, 50, constituting the recording and/or reproducing unit, so that these shafts 51, 51 and the positioning pins 50, 50 will be protruded into the inside of the tape cassette housing 1a.

These cassette positioning pins 50, 50 are engaged in positioning holes formed in the tape cassette for positioning the tape cassette. The capstan shafts 51, 51 are run in rotation by a driving motor, not shown, provided within the chassis 2, while being abutted against the magnetic tape housed within the tape cassette for feeding the magnetic tape.

On a lateral side of the cassette lid 135 are arranged a pair of pinch rolls 54, 54 of the recording and/or reproducing unit for being protruded into the tape cassette housing 1a, and a recording and/or reproducing head 52.

A recording and/or reproducing head 52 has a sliding contact with the magnetic tape for reading out signals from the magnetic tape. The pinch rolls 54, 54 are formed of a material having a large frictional coefficient, such as rubber, and cooperate with the capstan shafts 51, 51 for clamping the magnetic tape for assuring a positive tape feed operation by the capstan shafts 51.

On both sides of the head 52 are mounted a pair of tape guide members 53, 53. These tape guide members 53, 53 set the running position of the magnetic tape with respect to the head 52 by having the magnetic tape passed in central cut-outs thereof. The chassis 2 and the cassette lid 135 are connected to each other at mid portions thereof by turnable link members 55, 56.

These link members 55, 56 are turnably mounted on the chassis 2 and the cassette lid 135 for controlling the opening angle between the chassis 2 and the cassette lid 135.

Figure 2:
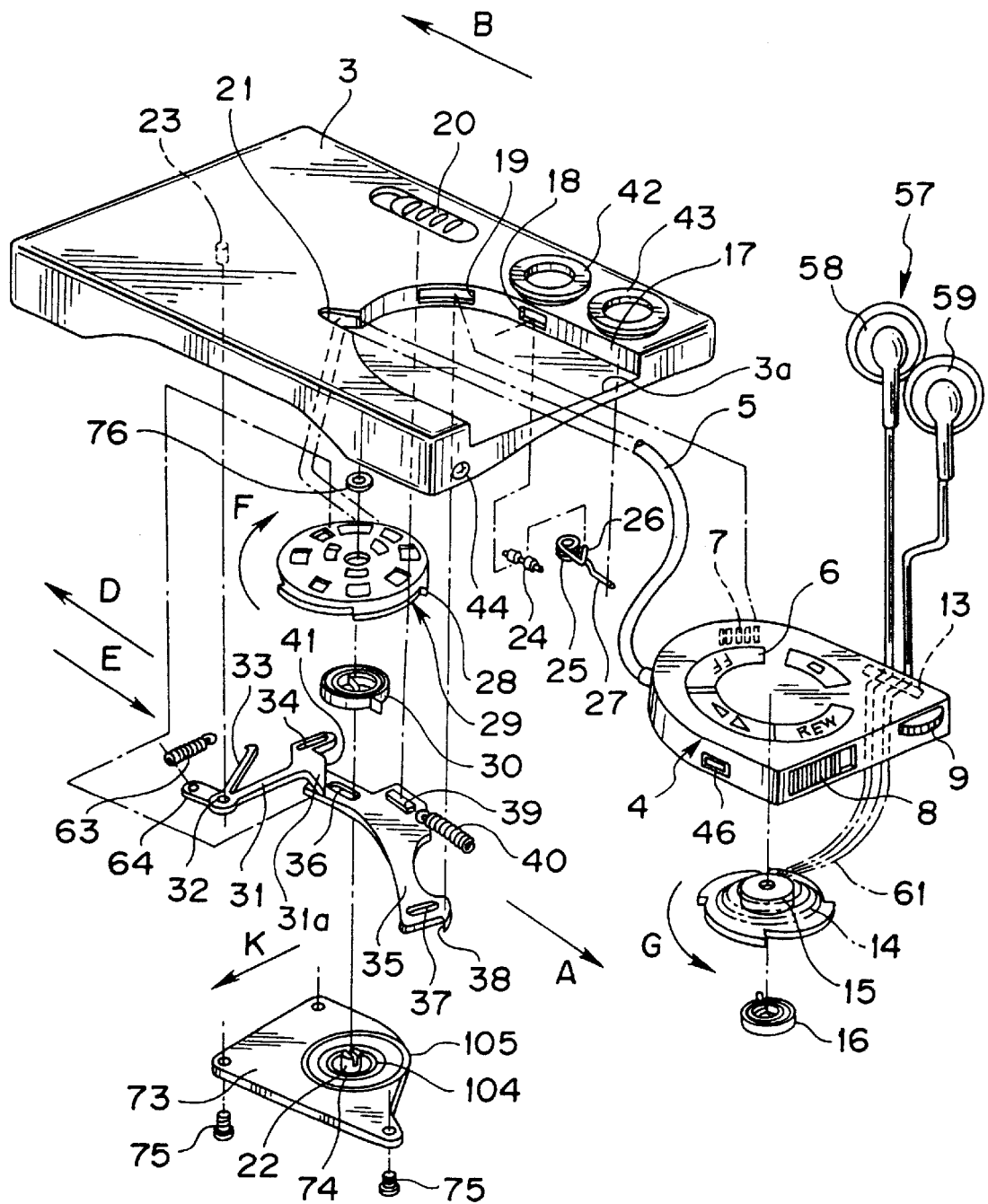
FIG. 2 is an exploded perspective view showing an arrangement of an outer casing of a main body portion of the tape player device.
Figure 3:
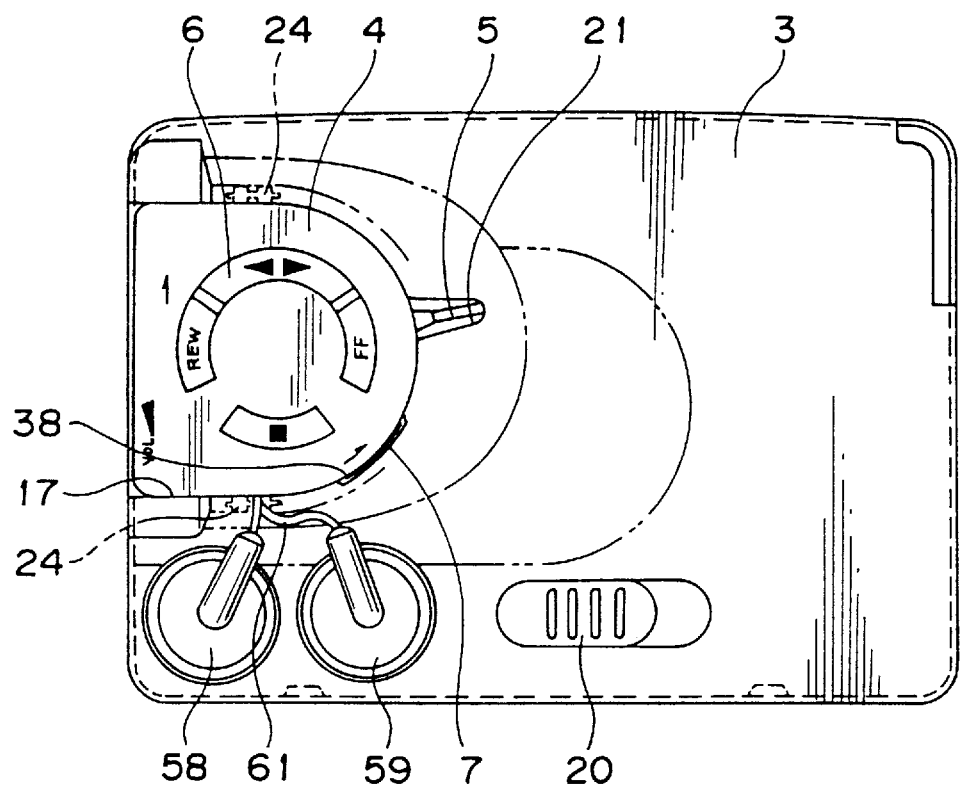
FIG. 3 is a plan view showing an arrangement of the tape player device.

In proximity to a lateral edge of the front panel 3 is formed a holder 17 for a remote controller, as shown in FIGS. 2 and 3. The holder 17 is formed as a cut-out mating with and accommodating the remote controller as later explained.

[2] Remote Controller

Figure 7:
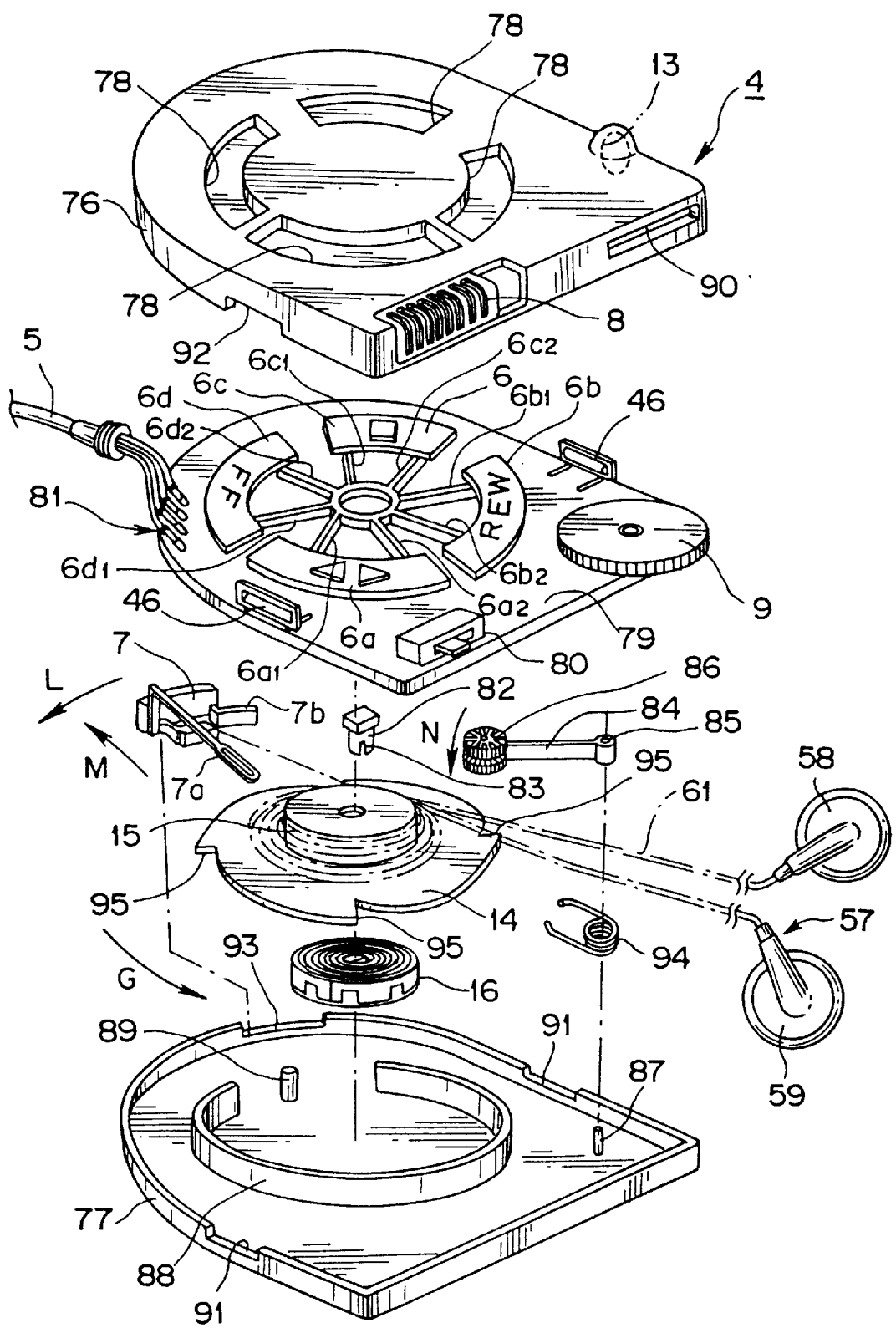
FIG. 7 is an exploded perspective view showing an arrangement of the remote controller.
Figure 8:
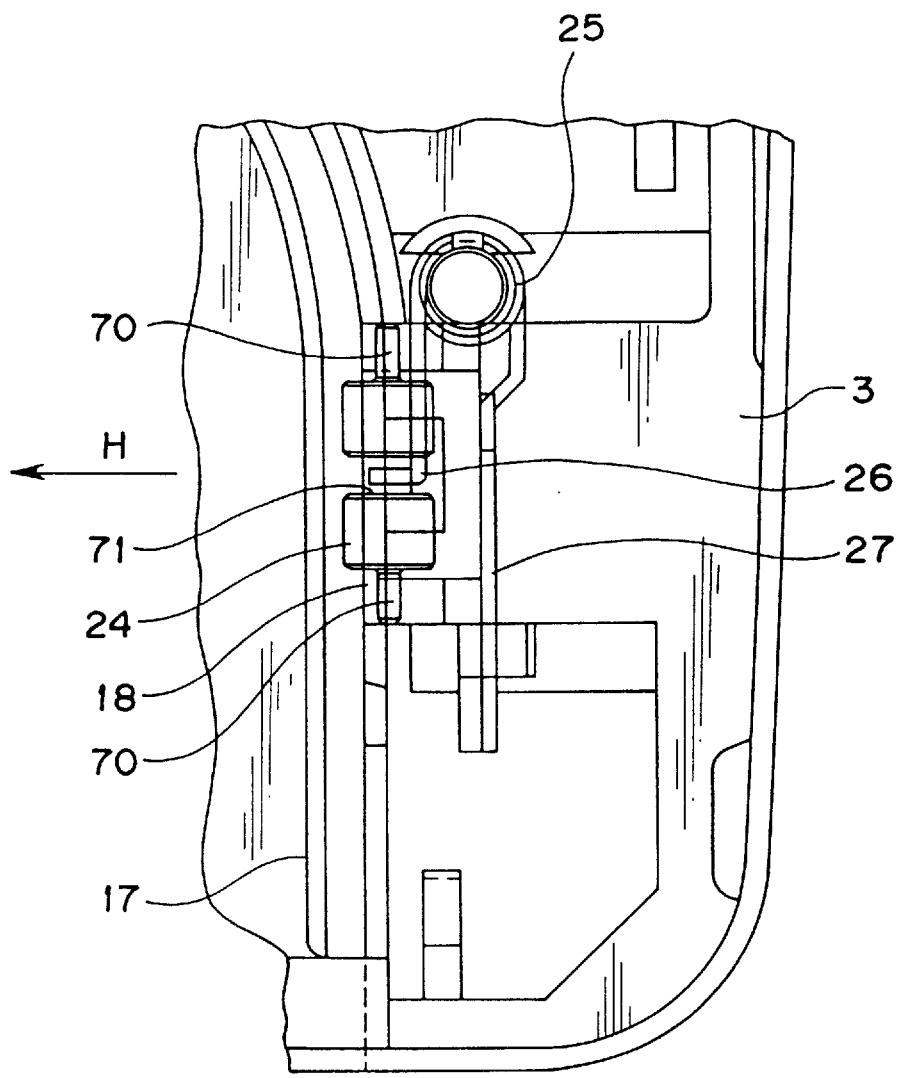
FIG. 8 is a plan view showing an arrangement of essential portions of one lateral side of the outer casing of the main body portion of the tape player device, with a portion thereof being broken away to permit an inside portion to be seen from outside.

The remote controller 4 includes a casing, formed by abutting upper and lower casings 76, 77 to each other, and a circuit board 79 comprised of a print board housed within the casing and a remote control circuit printed on the print board, as shown in FIG. 7.

The circuit board 79 has its front side designed as a component mounting surface on which to mount plural electronic components.

The remote controller 4 is designed to exchange operating signals with the recording and/or reproducing unit and is also designed to be mounted on and dismounted from the front panel 3 of the main body portion 1.

That is, the circuit board 79 is connected via a signal cable 5 and a first cable reel 29 as later explained to the electronic circuit board of the recording and/or reproducing unit. Each conductor bundle constituting the signal cable 5 has its one end soldered to a pre-set land 81 on the circuit pattern of the circuit board 79 of the remote controller 4.

The signal cable 5 has plural conductor bundles for exchanging output signals of the recording and/or reproducing unit and operating signals entering the recording and/or reproducing unit from the remote controller 4 between the circuit board of the recording and/or reproducing unit and the circuit board 79 of the remote controller 4.

On the circuit board 79 of the remote controller 4 are mounted a plurality of diaphragm switches, not shown, a hold switch 80, a volume knob 9, and a pair of lock groove members 46, 46 operating as contacts for the second operating signals.

On the plural diaphragm switches are mounted plural associated pushbuttons 6a, 6b, 6c and 6d constituting an operating switch 6. These pushbuttons 6a, 6b, 6c and 6d, formed of a flexible synthetic resin material, are integrally formed with supporting rods $6a_1$, $6a_2$, $6b_1$, $6b_2$, $6c_1$, $6c_2$, $6d_1$ and $6d_2$ of reduced diameters. That is, the pushbuttons 6a to 6d are formed as one arcuately-shaped continuous member by being connected to one another by the supporting rods $6a_1$, $6a_2$, $6b_1$, $6b_2$, $6c_1$, $6c_2$, $6d_1$, and $6d_2$.

The pushbuttons 6a to 6d face the upper side of the remote controller 4 via plural through-holes 78 formed in the upper surface of the remote controller 4. These pushbuttons 6a to 6d are thrust from the upper side towards the lower side of the remote controller 4 for thrusting the associated diaphragm switches disposed therebelow.

The pushbuttons 6a to 6d of the operating switch 6 are also employed as a playback switch (PLAY), a rewind switch (REW), a fast feed switch (FF) and a stop switch (STOP). That is, the remote controller 4 enters an operating signal associated with the thrust pushbutton to the circuit board of the recording and/or reproducing unit.

For example, if the playback switch PLAY, shown in FIG. 7 as or is pressed, an actuating signal for executing the playback mode by feeding the magnetic tape at a pre-set speed corresponding to the rotational velocity of the capstan shaft 51 for reading out signals by the head 52 enters the circuit board of the recording and/or reproducing unit for executing the playback mode.

When the fast feed switch (FF) is pressed, an actuating signal for executing the fast feed mode by feeding the magnetic tape in the forward direction at a fast rate enters the circuit board of the recording and/or reproducing unit for executing the fast feed mode.

When the rewind switch (REW) is pressed, an actuating signal for executing the rewind mode by feeding the magnetic tape in the reverse direction at a fast rate enters the circuit board of the recording and/or reproducing unit for executing the rewind mode.

When the stop switch (STOP) is pressed, an actuating signal for stopping the operation by canceling the playback mode, fast feed mode or the rewind mode enters the circuit board of the recording and/or reproducing unit for canceling the playback mode, fast feed mode or the rewind mode.

A hold switch is such a switch which, when thrown, maintains the mode which is currently executed. This hold switch 80 is actuated by a hold switch slider 8 slidably mounted on the upper cover 76 of the remote controller 4.

Figure 24:
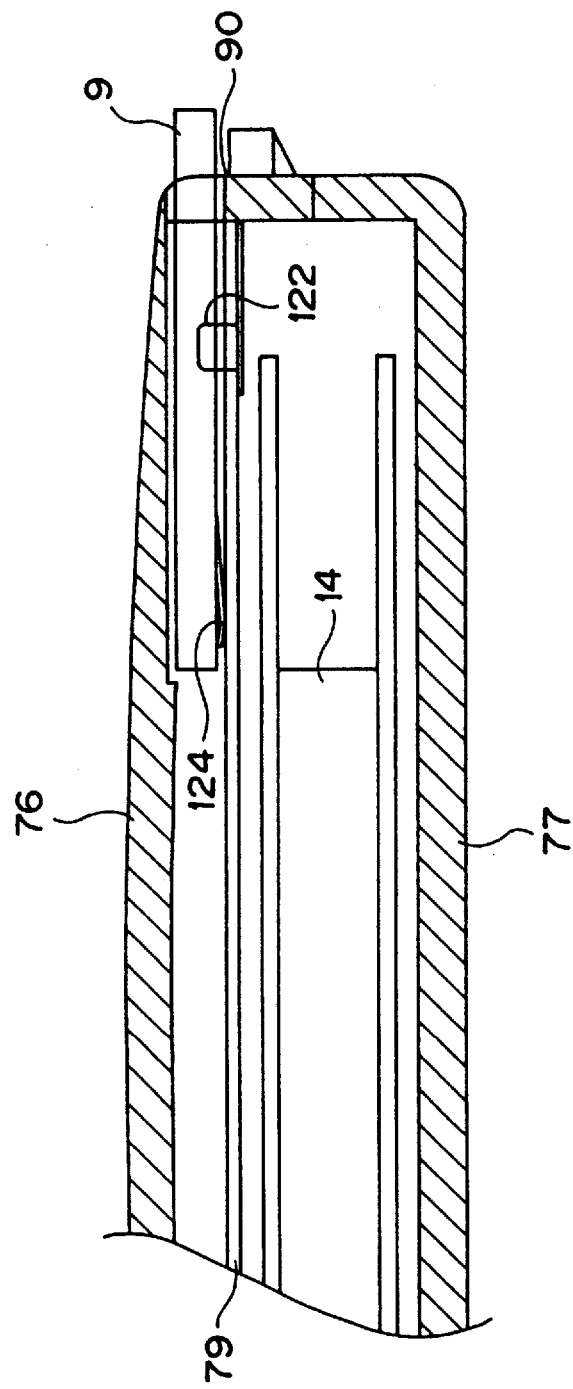
FIG. 24 is a longitudinal cross-sectional view showing essential portions of the remote controller of the tape player device.

The volume knob 9 is formed in a disc shape, as shown in FIG. 24. The volume knob 9 is supported for rotation relative to the circuit substrate 79 and has a portion of the outer peripheral portion thereof exposed to outside the remote controller 4 via a slit 90 formed in the upper cover 76.

The volume knob 9 is actuated for adjusting the level of acoustic signals transmitted via the signal cable 5 to the circuit board 79 of the remote controller 4 and thence to a headphone 57 as an electro-acoustic transducer as later explained. That is, the volume knob 9 constitutes a level-adjustment rotary volume along with a volume pattern formed on the surface of the circuit board 79 of the remote controller 4.

The volume knob 9 is fitted with a brush electrode 124 designed to have a sliding contact with the volume pattern on the circuit board 79. The volume knob 9 has its range of possible rotation limited by a stop pawl 122 arranged on the circuit substrate 79. The volume knob 9 is attached to the circuit board 79 by a metal plate provided with the stop pawl 122.

Since the rotary volume is constituted by the volume knob 9 rotatably mounted on the circuit board 79 and the volume pattern formed on the circuit substrate 79, the height of the rotary volume from the circuit board 79 may be suppressed so as to be 1.1 mm.

The lock grooves 46, 46 are formed of a conducting material, such as metal, and are connected to the circuit on the circuit substrate 79 parallel to the bundle of conductors of the signal cable adapted for exchanging the actuating signals. These lock groove members 46, 46 are exposed to outside via a pair of though-holes formed on either sides of the remote controller 4. These through-holes are formed by abutting cut-outs 92, 92, 91, 91 formed on both sides of the upper and lower covers 76, 77.

These lock groove members 46, 46 are formed with groove-shaped recesses on the sides thereof facing outwardly of the remote controller.

[3] Clip for Electronic Equipment

Figure 23:
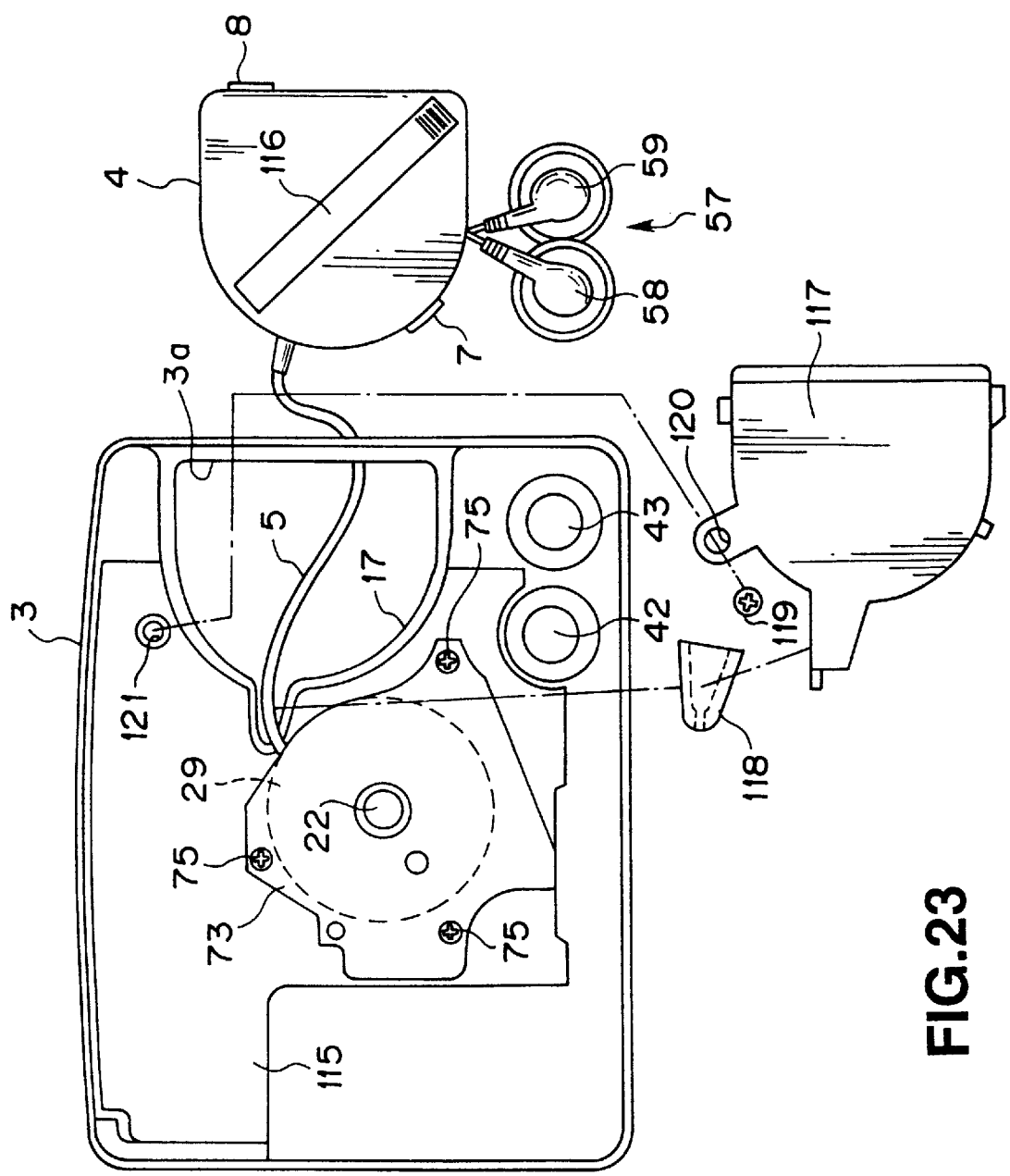
FIG. 23 is an exploded plan view showing a mounting process for the first cable reel.

The remote controller 4 has a clip for electronic equipment, as shown in FIG. 23.

Figure 25:
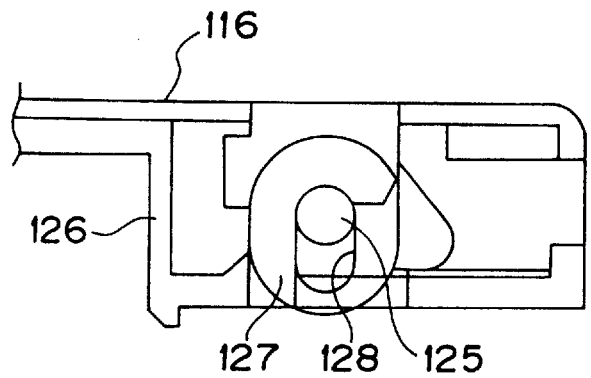
FIG. 25 is a side view showing the construction of essential portions of a clip for an electronic equipment mounted on the remote controller.
Figure 26:
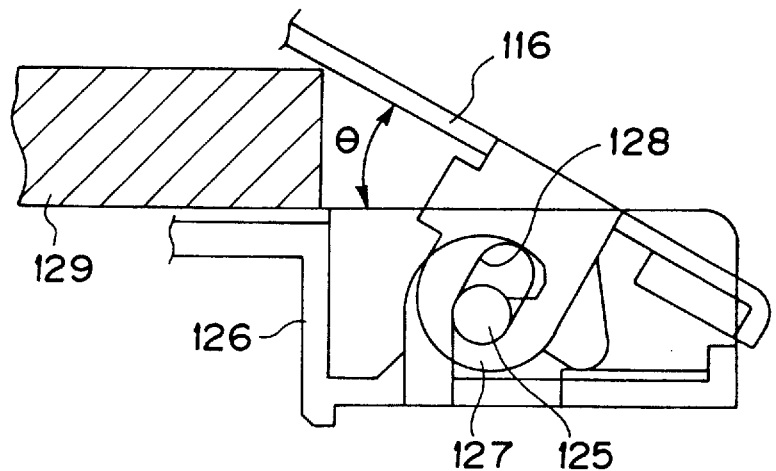
FIG. 26 is a schematic side view showing the first use state of the clip for the electronic equipment.
Figure 27:
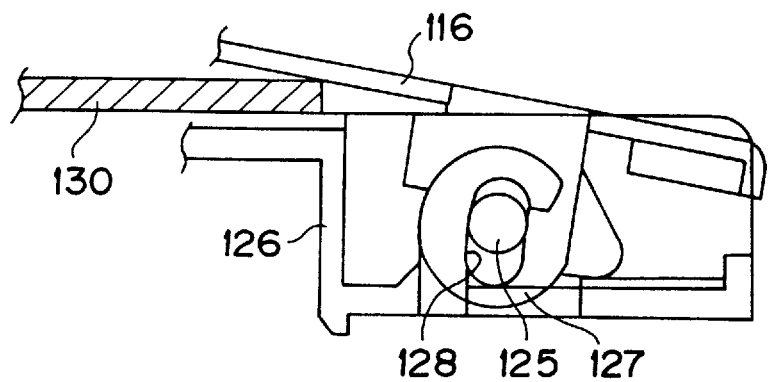
FIG. 27 is a schematic side view showing the second use state of the clip for the electronic equipment.

The clip for electronic equipment includes a clip supporting shaft 125 arranged within a casing made up of the upper and lower casings 76, 77 and a rotary plate 116 rotatably mounted on the clip supporting shaft 125, as shown in FIGS. 25, 26 and 27.

The clip supporting shaft 125 is exposed to outside the casing via a through-hole 126 formed in the casing of the remote controller 4. The rotary plate 116 is substantially strip-shaped and has a supporting hole 128 at the proximal side thereof. The rotary plate 116 is rotatably supported by the clip supporting shaft 125 by having the clip supporting shaft 125 inserted into the supporting hole 128. The rotary plate 116 has its proximal end intruded into the through-hole 126 while having its distal end portion extended along the bottom of the casing of the remote controller 4.

The rotary plate 116 is rotationally biased by a biasing member, such as a torsion coil spring, not shown, in a direction of approaching the bottom surface of the casing of the remote controller 4. Thus, in the usual state, the rotary plate 116 is held so that it has no portion protruded from the casing bottom.

The rotary plate 116 cooperates with the outer lateral surface of the casing of the remote controller for clamping an edge of an apparel 130 of the user of the tape player device, as shown in FIG. 27. The remote controller 4 is held at this time on the apparel 130 of the user.

The supporting hole 128 is formed as an elongated hole extending along the direction of rotation of the rotary plate 116. Thus, if a cloth of a larger thickness 129 is clamped between the rotary plate 116 and the casing, the rotary plate 116 is rotated around the clip supporting shaft 125, while being moved in a direction in which the proximal end thereof is displaced away from the casing of the remote controller 4, as the clip supporting shaft 125 is moved within the supporting hole 128. Thus it is possible for the rotary plate 116 to cooperate with the casing to positively clamp the cloth of larger thickness 129 while suppressing an angle of rotation θ of the remote controller 4 with respect to the casing to a smaller value, as shown in FIG. 26.

[4] First Cable Reel

Within the main body portion 1, there is rotatably mounted the first cable reel 29 configured for taking up the signal cable 5 and for housing the signal cable 5 within the main body portion 1.

Figure 15:
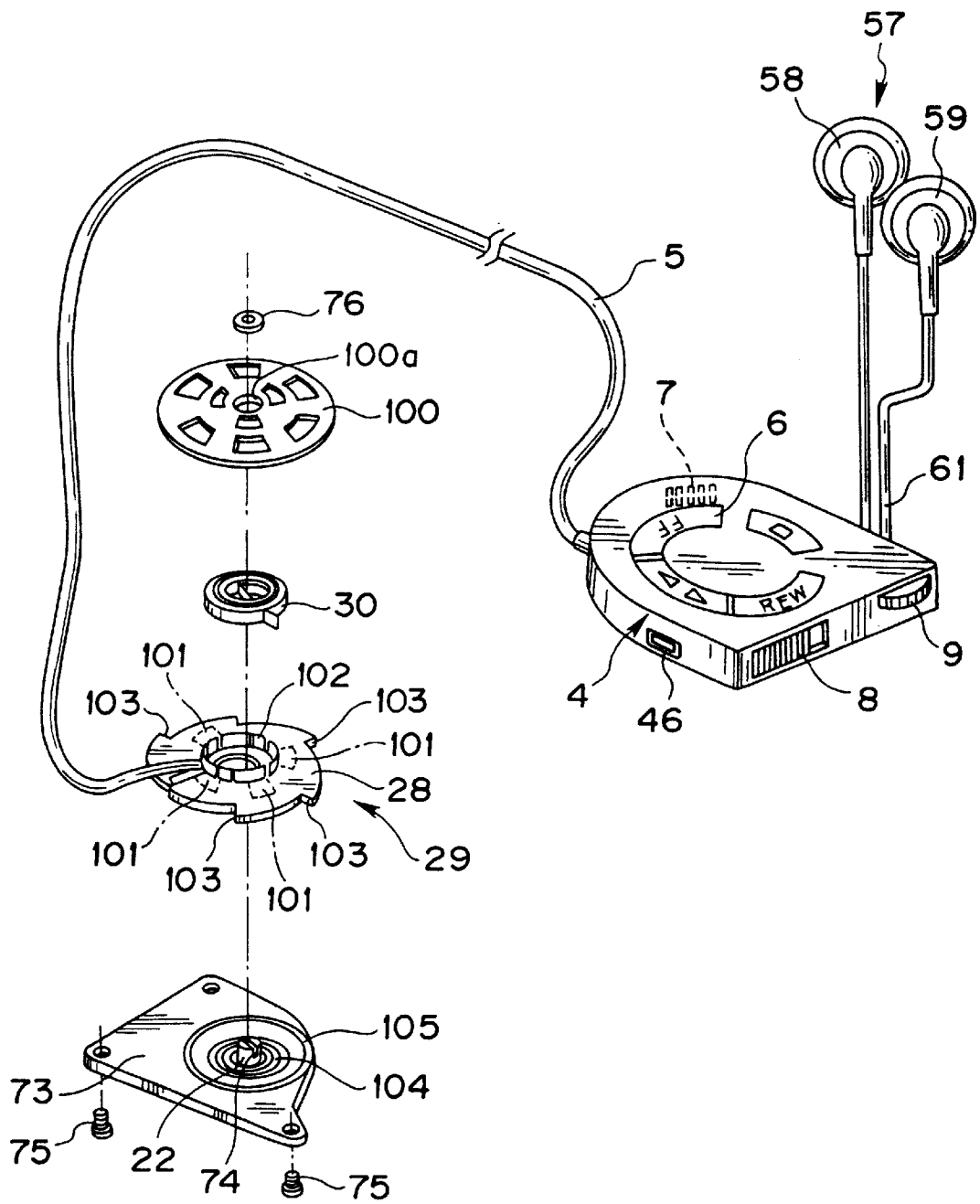
FIG. 15 is an exploded perspective view showing an arrangement of a first cable reel of the tape player device.
Figure 22:
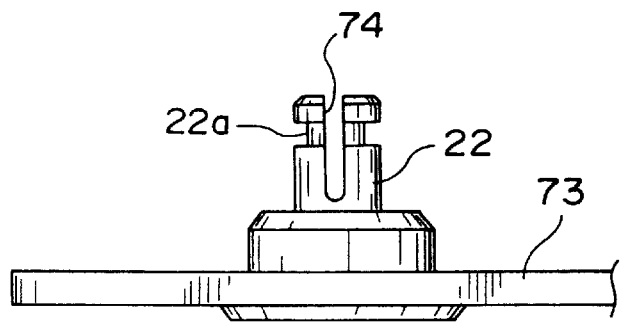
FIG. 22 is a side view showing the construction of a reel supporting shaft supporting the first cable reel.

The first cable reel 29 is rotatably supported by a reel supporting shaft 22 set on a relay substrate 73 mounted on the back surface of the front panel 3 by a screw 75 and is disposed between the relay substrate 73 and the front panel 3. The reel supporting shaft 22 is set on the relay substrate 73 and has an axially extending slit 74 from its distal end, while having a groove 22a at the outer periphery of the distal end thereof for holding the first cable reel 29 by the reel supporting shaft 22, as shown in FIGS. 15 and 22.

Figure 20:
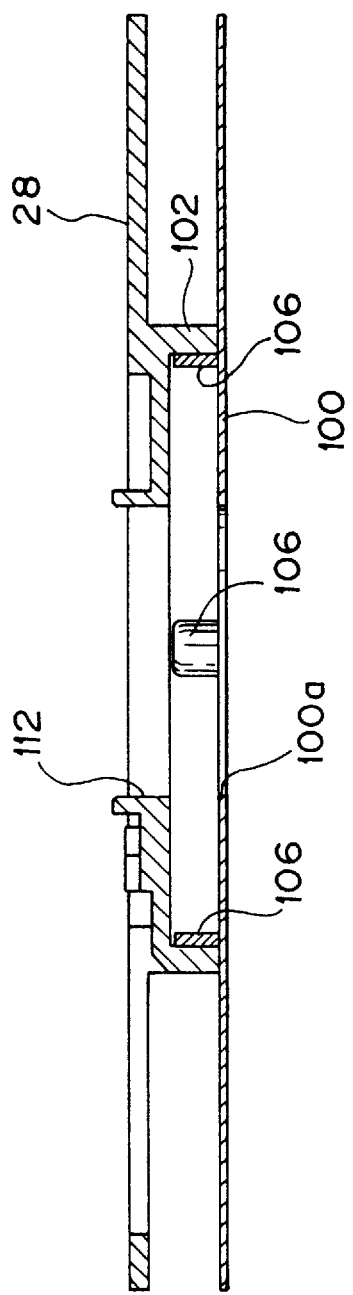
FIG. 20 is a longitudinal cross-sectional view showing an arrangement of a first cable reel of the tape player device.
Figure 21:
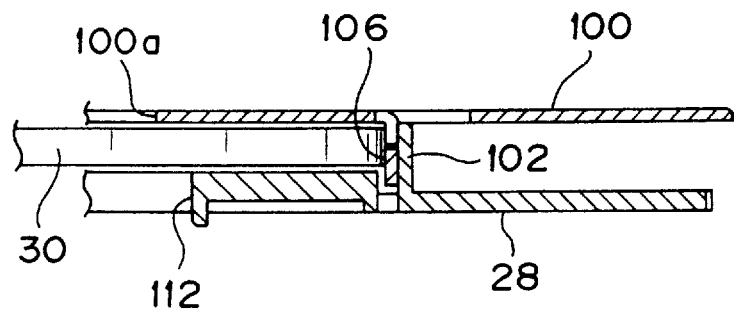
FIG. 21 is a schematic longitudinal cross-sectional view showing the construction of essential portions of the first cable reel.

The first cable reel 29 has a flange member 100 and a first ratchet wheel 28 on which the flange member 100 is engaged and mounted, as shown in FIGS. 20 and 21.

The flange member 100 is formed substantially in a disc shape from a metal material. The flange member 100 has a through-hole 100a passed through by the reel supporting shaft 22 and a series of toroidally arranged engagement pawls 106 surrounding the through-hole 100a. Before the flange member 100 is mounted on the first ratchet wheel 28, the inner lateral side of the engagement pawl 106 of the flange member 100 holds the outer peripheral surface of a spirally wound first elastic member 30. The first ratchet wheel 28 is formed of a synthetic resin in a substantially disc shape, and has a though-hole 112 at a mid portion thereof passed through by the reel supporting shaft 22, while having an engagement wall section 102 encircling the through-hole 112 and engaged with the engagement pawl 106 of the flange member 100.

That is, when the engagement wall section 102 of the ratchet wheel 28 is engaged with the engagement pawl 106, the first ratchet wheel 28 cooperates with the flange member 100 for clamping the first main spring 30.

The first cable reel 29 is supported by the reel supporting shaft 22 which is passed through the through-holes 100a and 112 of the first ratchet wheel 28 and the flange member 100. The first cable reel 29 is prevented from being detached from the reel supporting shaft 22 by the washer 76 being fitted on the distal end of the reel supporting shaft 22.

The engagement wall section 102 of the first ratchet wheel 28 operating as a hub of the first cable reel 29 holds the opposite end of the signal cable 5, as shown in FIG. 15. The opposite end of each conductor bundle of the signal cable 5 is connected in association with each of plural brush electrodes 101 provided on the first ratchet wheel 28. These brush electrodes 101 are formed of an electrically conductive material, such as a copper plate.

The brush electrodes 101 mounted on the first ratchet wheel 28 are slidingly contacted with plural concentrically arranged electrode ring patterns 104, 105 formed on the relay substrate 73.

Figure 6:
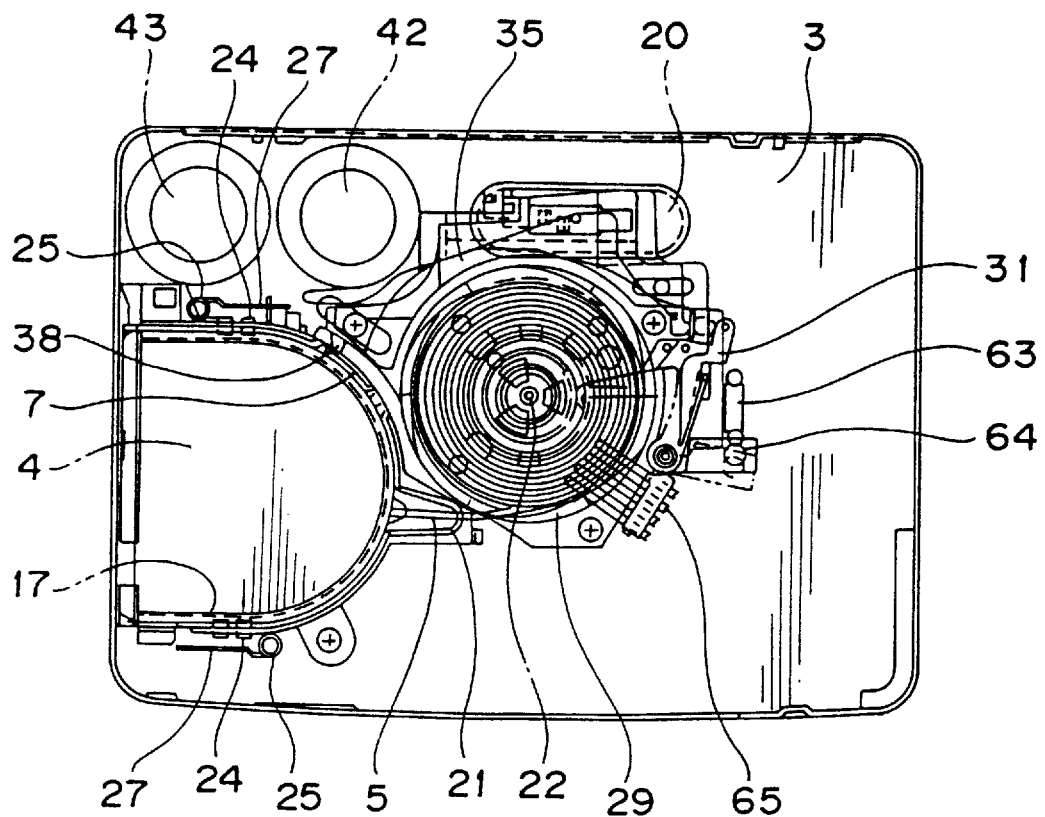
FIG. 6 is a bottom plan view showing an arrangement of an outer casing of a main body portion of the tape player device.

The electrode ring patterns 104, 105 provided on the relay substrate 73 are contacted with associated plural terminals pieces 65 provided on the circuit board of the recording and/or reproducing unit so as to be connected by these contact pieces 65 to the circuit board, as shown in FIG. 6. That is, the conductor bundles of the signal cable 5 are connected to the circuit board of the recording and/or reproducing unit.

The first main spring 30 has its outer peripheral end portion retained by an engagement pawl 106 of the flange member 100. When the first cable reel 29 is supported by the reel supporting shaft 22, the first main spring has its inner peripheral end portion retained by the slit 74 formed in the reel supporting shaft 22. The first elastic member 30 rotationally biases the first cable reel 29 in a direction in which the signal cable 5 is taken up on the first cable reel 29, as indicated by arrow F in FIG. 2.

The first cable reel 29 has its one end connected to the other end of the signal cable 5 connected to the remote controller 4 so as to be supported by the relay substrate 73, and subsequently the relay substrate 73 is mounted within the outer casing of the main body portion 1, so that the first cable reel is mounted within the outer casing, as shown in FIGS. 15 and 23.

Thus, with the present tape player device, the state of connection from the relay substrate 73 through the first cable reel 29 and the signal cable 5 to the remote controller 4 may be completed before mounting the relay substrate 73 on the front panel 3.

The front panel 3 has an opening 3a into which can be introduced the remote controller 4. This opening 3a is closed by a plate metal member 117 after the relay substrate 73 is mounted on the inner surface of the front panel 3. This opening 3a constitutes the holder 17 for the remote controller holder 4 along with the plate metal member 117. The plate metal member 117 is secured to the front panel 3 by a set screw 119 for mechanically rein forcing the front panel 3.

The portion of the holder 17 of the remote controller 4 directed towards the first cable reel 29 carries a cap member 118. The cap member 118 closes the gap defined between the plate metal member 117 and the front panel 5 except a small opening sufficient to barely permit the passage therethrough of the signal cable 5.

Within the main body portion is arranged a first retention mechanism inhibiting rotation of the first cable reel 29 in such a manner as to enable cancellation of the state of inhibition of rotation, as shown in FIG. 2. This first retention mechanism is made up of a retention lever 31 and a retention canceling lever 35.

The retention lever 31 is turnably supported by passing the supporting shaft 23 set on the back surface of the front panel 3 through a supporting hole 32 formed in the proximal end of the retention lever 31. The retention lever has at its distal end portion a hook-shaped retainer 31a adapted for being engaged with a tooth 103 of the first ratchet wheel 28.

This retention lever 31 is rotationally biased by a plate spring member 33 and a tension spring 63 integrally formed therewith in a direction of engaging the retainer 31a with the tooth 103 of the first ratchet wheel 28, as indicated by arrow F in FIG. 2. The tension coil spring 63 is mounted under tension between a retention pin 64 on the proximal side of the retention lever 31 and the back surface of the front panel 3.

This retention lever 31 has its retainer 31a engaged in the tooth 103 of the first ratchet wheel 28 for inhibiting rotation of the first cable reel 29 in a direction corresponding to the direction of the biasing force of the first elastic member 30 of the first cable reel 29. Even if the retention lever 31 has its retainer 31a engaged with the tooth 103 of the fist ratchet 28, the retention lever 31 causes the retainer 31a to have a sliding contact with the first ratchet wheel 28 without obstructing rotation of the first cable reel 29 provided that the first cable reel 29 is rotated in a direction opposing the bias of the first elastic member 30.

The retention canceling lever 35 has guide slits 36, 37 into which guide supporting shafts set on the back surface of the front panel 3 are inserted for slidably supporting the retention canceling lever 35.

This retention canceling lever 35 has an engagement pin 41 at one end thereof engaged in an engagement slit 34 formed at the distal end of the retention lever 31. This retention canceling lever 35 is biased by a tension coil spring 40 in a direction in which the retainer 31a of the retention lever 31 is turned in a direction in which the retainer 31a of the retention lever 31 is engaged with the tooth 103 of the first ratchet wheel 28, as indicated by arrow A in FIG. 2.

This retention canceling lever 35 is slid against the bias of the tension coil spring 40 for turning the retention lever 31 as indicated by arrow D in FIG. 2 for disengaging the retainer 31a of the retention lever 31 from the first ratchet wheel 31.

The retention canceling lever 35 has a coordinating lug 39 which is coordinated to a cable engagement slider 20 slidably arranged in the front panel 3. This slider 20 is supported by an edge of the through-hole 3a formed in the front panel 3 for facing the front and back sides of the front panel 3 and is coordinated on the back surface thereof with the coordinating lug 39 of the retention canceling lever 35.

The cable engagement slider 20 is slid in a direction opposite to the direction of bias force of the tension coil spring 40 for turning the retention lever 31 via the retention cancellation lever 35 for disengaging the retainer 31a of the retention lever 31 from the first ratchet wheel 28, as indicated by arrow B in FIG. 2.

When the retainer 31a of the retention lever 31 is disengaged from the first ratchet wheel 28, the first cable reel 29 is rotated under the bias force of the first elastic member 30.

[5] Headphone Device

To the circuit board 79 of the remote controller 4 is connected the headphone device 57 via a cable bundle 61, made up of a set of two signal cables, and via a second cable reel 15, as later explained.

Figure 12:
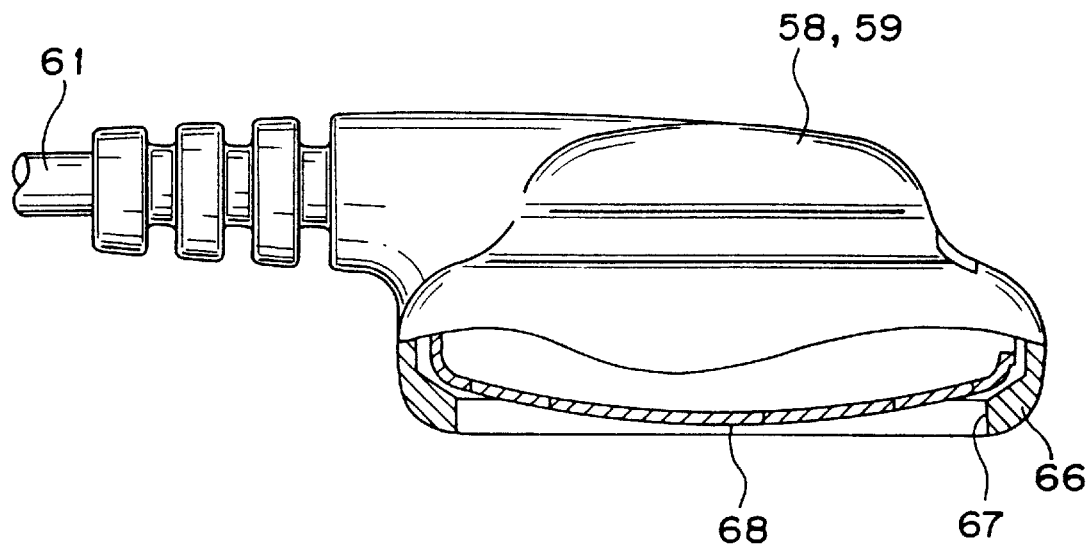
FIG. 12 is a side view showing an arrangement of a unit portion of the headphone device of the tape player device, with a portion being broken away.

The headphone device 57 has a pair of unit portions, that is left and right unit portions 58, 59, as shown in FIGS. 2 and 12. These unit portions 58, 59 make up a speaker unit 68. This speaker unit 68 has a diaphragm, a voice coil mounted on the diaphragm, and a magnetic circuit for moving the voice coil, and converts the input electrical signals into the audible sound.

The cable bundle 61 is made up of a set of two signal cables in association with the unit portions 58, 59. This cable bundle 61 is extracted via a through-hole 13 formed in the lateral surface of the upper cover 76 of the remote controller 4 to outside of the remote controller 4.

Each of the unit portions 58, 59 has a cover 66 sheathing the outer surface of the speaker unit 68. This cover 66 has a mouthpiece (sound radiating opening) 67 for exposing the front surface of the speaker unit 68 to outside.

This headphone device 57 exchanges signals with the circuit board of the recording and/or reproducing unit over the cable bundle 61 and the signal cable 5.

[6] Signal Cable

Figure 29:
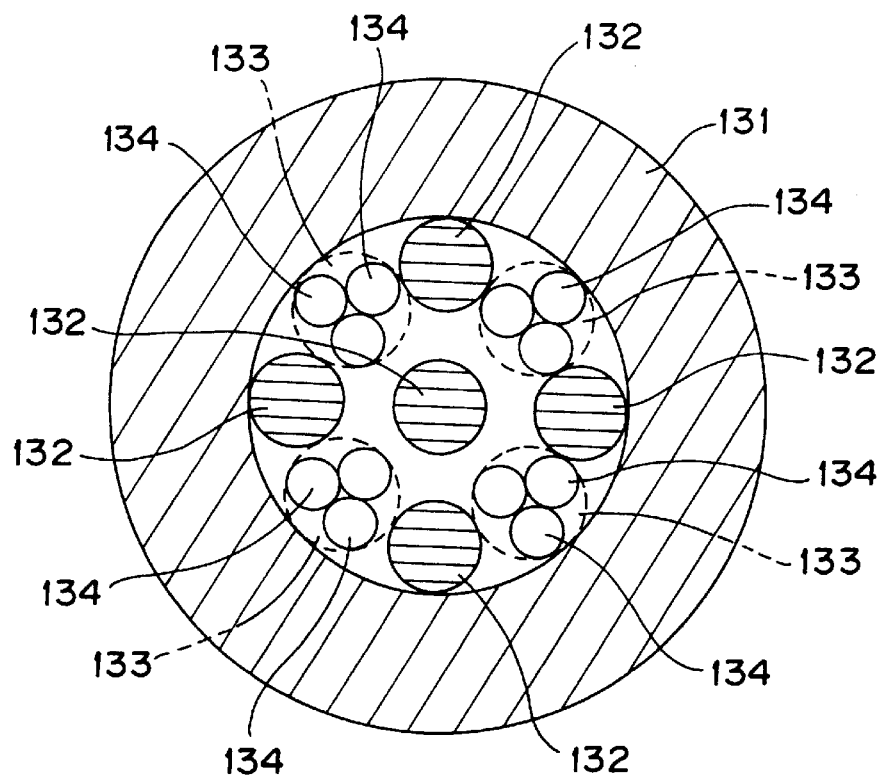
FIG. 29 is a cross-sectional view showing the construction of the signal cables of the tape player device.

The signal cable 5 is a so-called four-core signal cable and is made up of four sets of conductor bundles 134, five reinforcement yarns 132 arranged outside of and parallel to these conductor bundles 134 and a sheath 131 covering the conductor bundles 134 and the reinforcement yarns 132, as shown in FIG. 29. The conductor bundles 134 are arrayed arcuately along the inner surface of the sheath 131. Four of the reinforcement yarns 132 are arrayed arcuately along the inner surface of the sheath 131 in alternation with the conductor bundles 134 while the remaining reinforcement yarn is positioned on the center axis of the signal cable 5.

With the tape player device, the conductor bundles 134 of the signal cable 5 are used for operating signals, right-channel signals and left-channel signals and as a grounding line.

Figure 28:
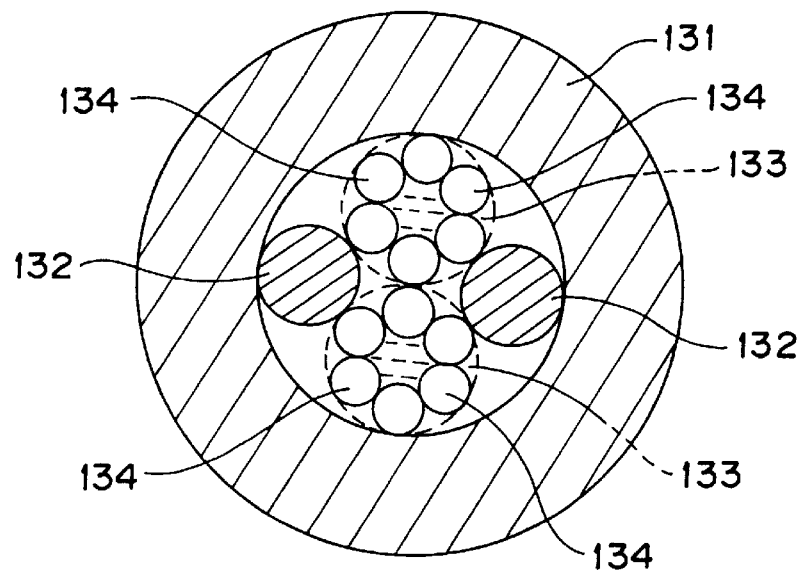
FIG. 28 is a cross-sectional view showing the construction of signal cables making up a cable bundle of the tape player device.

Each signal cable constituting the cable bundle 61 is a so-called two-core signal cable and is made up of two sets of conductor bundles 134, two reinforcement yarns 132 arranged outside of and parallel to these conductor bundles 134 and a sheath 131 covering the conductor bundles 134 and the reinforcement yarns 132, as shown in FIG. 28. The conductor bundles 134 and the reinforcement yarns 132 are arrayed alternately and arcuately along the inner surface of the sheath 131.

With the tape player device, the conductor bundles 134 of the respective signal cables constituting the cable bundle 61 are used for right- or left channel and as a grounding line, respectively.

The reinforcement yarn 132 is a yarn-like member of a synthetic resin with a diameter on the order of 200 $\mu$m. The materials that make up the reinforcement yarn 132 may be enumerated by "Vectoran" or "Kepler" (both being trade names).

Each conductor bundle 134 is constituted by three to six enamel coated lines. As these enamel coated lines, those on the order of 0.06A·2UE are employed.

If the number of enamel coated lines in the conductor bundle 134 is six, that is, in the signal cable constituting the cable bundle 61, a yarn-like material 133 about 100 μm in diameter, formed of a synthetic resin which is the same as the material making up the reinforcement yarn 132, is wound between respective enamel coated lines, as shown in FIG. 28.

The sheath 131 is formed of a material consisting in a mixture of vinyl chloride and an elastomer. Thus the sheath 131 exhibits superior durability such that it is not ruptured even if it is reduced in thickness or a tensile force or a bending force is applied to the signal cable.

This sheath 131 exhibits good lubricity and permits smooth winding and pay-out even when it is wound on or paid out from the first cable reel 29 or the second cable reel 15 as later explained.

The reinforcement yarns 132 are arrayed outside of and parallel to the conductor bundles 134 and the sheath 131 is reduced in thickness so that the outer diameter of the signal cable 5 as the four-core signal cable is on the order of 0.85 mm.

The reinforcement yarns 132 are arrayed outside of and parallel to the conductor bundles 134 and the sheath 131 is reduced in thickness so that the outer diameter of the signal cable 5 constituting the cable bundle 61 as the two-core signal cable is on the order of 0.7 mm.

[7] Second Cable Reel

Within the remote controller 4, the second cable reel 15 for taking up the cable bundle 61 for housing the cable bundle 61 in the remote controller 4 is rotatably mounted, as shown in FIG. 7.

The second cable reel 15 is set on the lower surface of the upper cover 76 of the remote controller 4 so as to be directed to the inside of the remote controller 4 and is housed within the remote controller 4 by being rotatably supported by the reel supporting shaft 82 passed through the circuit board 79. That is, the second cable reel 15 is positioned on the reverse surface of the circuit board 79.

One end of the cable bundle 61 is held by the hub portion of the cable reel 15. One end portion of the conductor bundle of each signal cable constituting the cable bundle 61 is connected to each of associated brush electrodes provided on the second cable reel. These brush electrodes are formed of an electrically conductive material, such as a copper plate.

The brush electrodes provided on the second cable reel 15 are slidingly contacted with plural concentric electrode ring patterns formed on the circuit board 79 of the remote controller 4 so as to be connected to the circuit substrate 79 via these electrode ring patterns.

That is, the conductor bundles of the respective signal cables constituting the cable bundle 61 are connected to the circuit board 79 of the remote controller 4 and are connected via the circuit board 79 and the signal cable 5 to the recording and/or reproducing unit of the main body portion 1.

The second cable reel 15 has a second ratchet wheel 14. The second cable reel 15 is fitted with a spirally shaped second elastic member 16 for rotationally biasing the second cable reel 15 in a direction of taking up the cable bundle 61.

The second elastic member 16 is spirally wound, and has its outer peripheral end portion retained by a hub portion of the second cable reel 15, while having its inner peripheral end portion retained by a slit 83 formed in the reel supporting shaft 82.

The second elastic member 16 rotationally biases the second cable reel 15 in a direction of taking up the cable bundle 61 on the second cable reel 15, as indicated by arrow G in FIG. 7.

Within the remote controller 4 is mounted a second retention mechanism for inhibiting rotation of the second cable reel 15 so as to enable cancellation of the inhibition of rotation. This second retention mechanism is constituted by the retention slider 7.

The second slider 7 is slidably supported by an edge portion of a through-hole 93 provided on the lateral side of the remote controller 4. This retention slider 7 has a plate spring portion 7a formed integrally therewith and a retainer 7b engaged with a tooth 95 of the second ratchet wheel 14.

This retention slider 7 has an integral plate spring portion 7a abutted against an abutment pin 89 set upright on the remote controller 4 so that the retention slider is biased into movement in a direction opposite to the direction of arrow L in FIG. 2, that is in a direction of engaging the retainer 7a with the tooth 95 of the second ratchet wheel 14.

This retention slider 7 has the retainer 7b engaged with the tooth 95 of the second ratchet wheel 14 for inhibiting rotation of the second cable reel 15 in a direction conforming to the bias force of the second winding spring (elastic member) 16. Even if the retention slider 7 has its retainer 7b engaged with the tooth 95 of the first ratchet wheel 14, the retention slider 7 causes the retainer 7b to have a sliding contact with the first ratchet wheel 14 without obstructing rotation of the second cable reel 15 if the first cable reel 159 is rotated in a direction opposing the bias of the first elastic member 16.

The retention slider 7 is slid against the bias of the plate spring portion 7a as indicated by arrow L in FIG. 7, so that the plate spring 7a ia abutted against the abutment pin 89 as indicated by arrow M in FIG. 7 for displacing the retainer 7b away from the second ratchet wheel 14.

When the retainer 7b of the retention slider 7 is displaced away from the second ratchet wheel 14, the second cable reel 15 is rotated under the force of bias of the second elastic member 16.

If, when the remote controller 4 is housed and held within the holder 17 provided within the main body portion 1, the inhibition of rotation of the first cable reel 29 by the first retention mechanism provided in the first body portion 1 is canceled, the second retention mechanism of the remote controller 4 is actuated in association with the operation of cancellation so that inhibition of rotation of the second cable reel 15 by the second retention mechanism is canceled.

Figure 9:
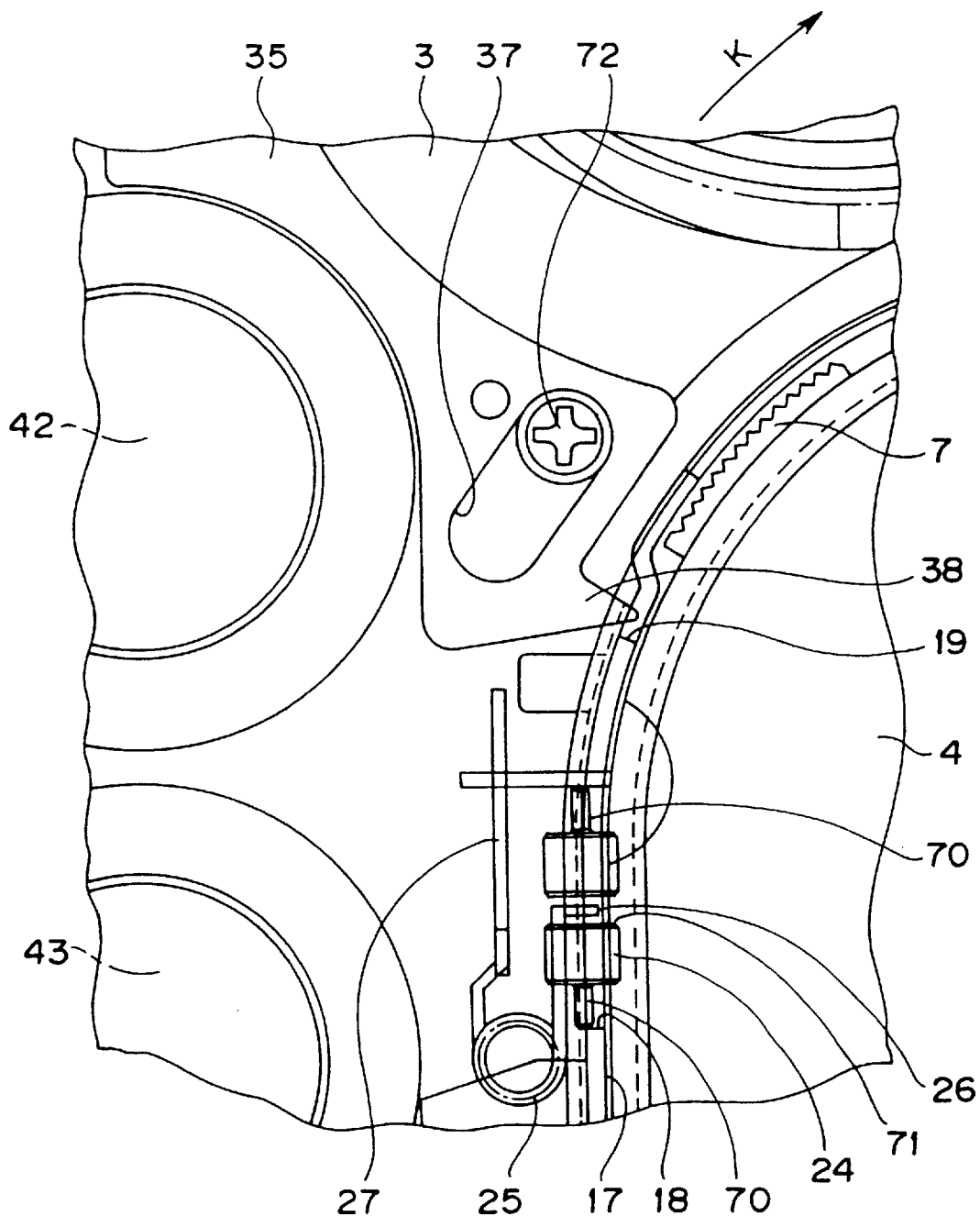
FIG. 9 is a plan view showing an arrangement of essential portions of an opposite lateral side of the outer casing of the main body portion of the tape player device, with a portion thereof being broken away to permit an inside portion to be seen from outside.

That is, when the cable engagement slider 20 is slid in a direction against the force of bias of the tension coil spring 40 as indicated by arrow B in FIG. 2, an actuating pawl 38 formed on the opposite end of the retention cancellation lever 35 is slid in the sliding direction of the retention slider 7 of the remote controller 4 located within the holder 17 as indicated by arrow K in FIGS. 2 and 9.

The actuating pawl 38 is intruded via a through-hole 19 formed in the lateral surface of the holder 17 into the inside of the holder 17.

Thus, if the remote controller 4 is positioned at a pre-set position in the inside of the holder 17, the actuating pawl 38 causes the retention slider 7 to be moved against the bias of the plate spring 7a of the retention slider 7.

Within the remote controller 4, a first cable pay-out roll 107 having a first meshing portion 113 is rotatably mounted laterally of and in the vicinity of the second cable reel 15, as shown in FIGS. 7 and 16 to 19. This first cable pay-out roll 107 is supported by a roll supporting shaft 109 mounted upright within the casing of the remote controller 4. The roll supporting shaft 109 supporting the first cable pay-out roll 107 is provided for extending parallel to the rotary shaft of the second cable reel 15.

Within the remote controller 4, the second cable pay-out roll 86 having a second meshing portion 114 meshing with the first meshing portion 113 is rotatably mounted laterally of and in the vicinity of the second cable reel 15 and the first cable pay-out roll 107. This second cable pay-out roll 86 is rotatably supported by the roll supporting shaft 110 provided at the distal end of a rotary lever 84 provided laterally of the second cable reel 15. The roll supporting shaft 110 supporting the second cable pay-out roll 86 is provided for extending parallel to the rotary shaft of the second cable reel 15.

The rotary lever 84 has a supporting hole 85 at its proximal end and is rotatably supported by introducing a supporting shaft 87 set upright within the remote controller 4 into the supporting hole 85.

Figure 16:
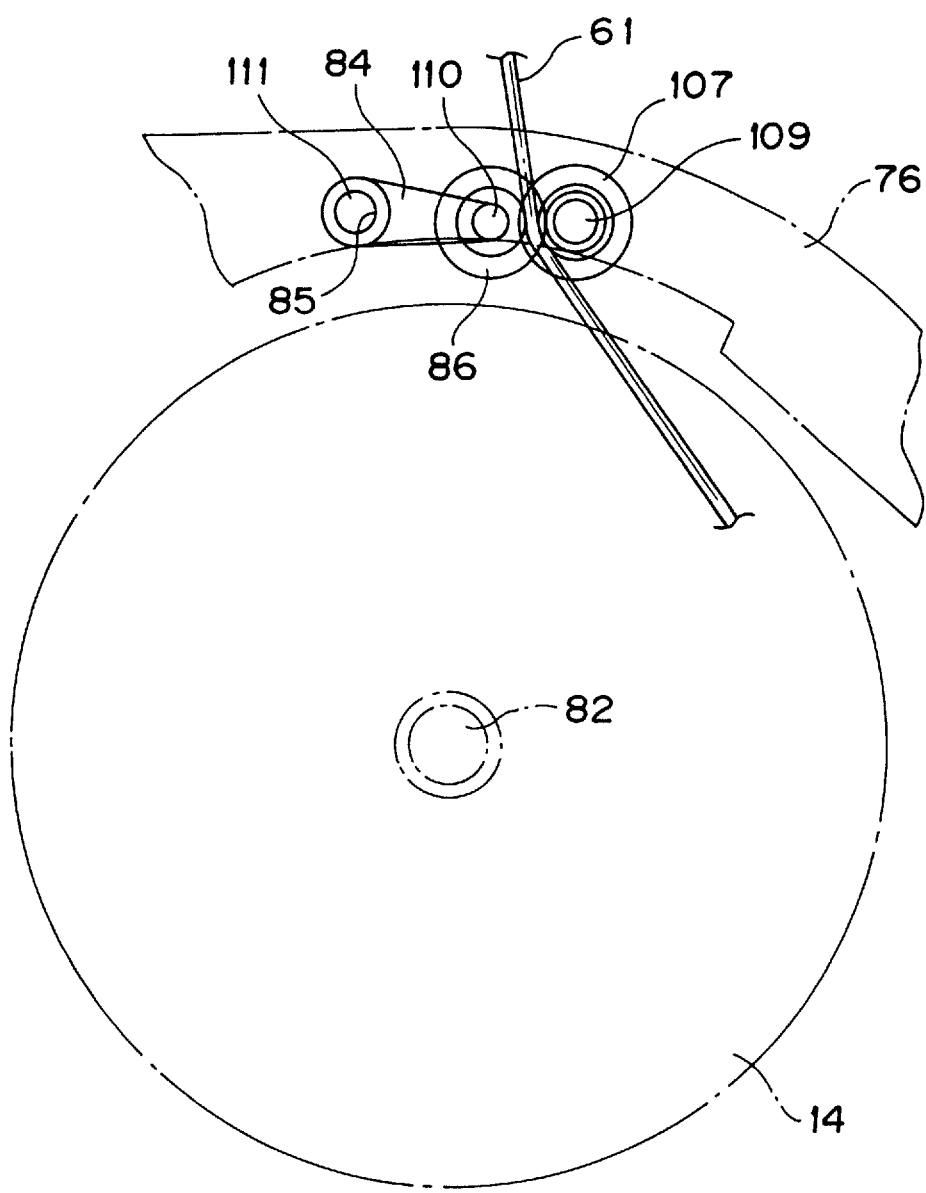
FIG. 16 is a plan view showing an arrangement of a cable payout roll provided in the vicinity of the first cable reel of the tape player device, with the cable pay-out roll being shown in an operating state.
Figure 17:
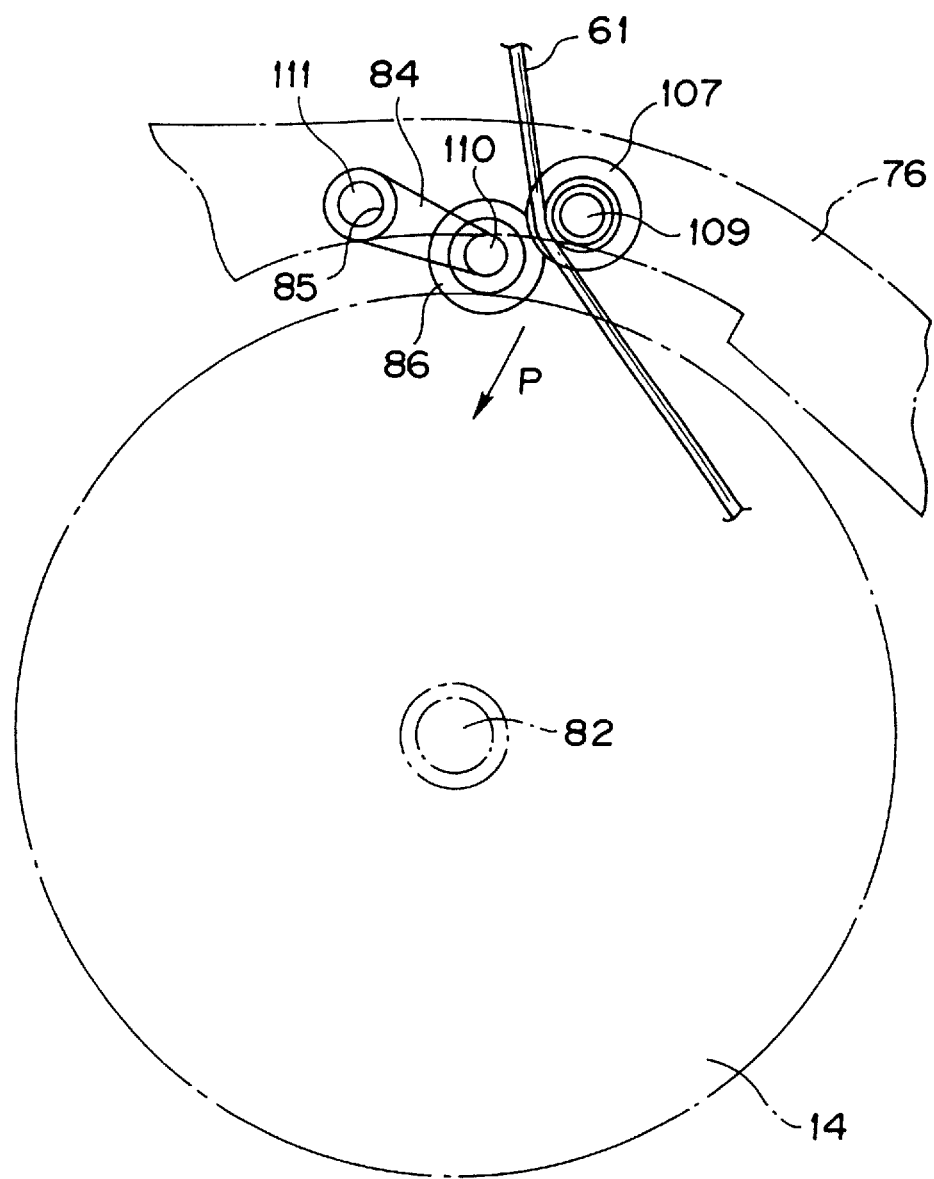
FIG. 17 is a plan view showing an arrangement of the cable pay-out roll of the tape player device, with the cable pay-out roll being shown in a non-operating state.
Figure 18:
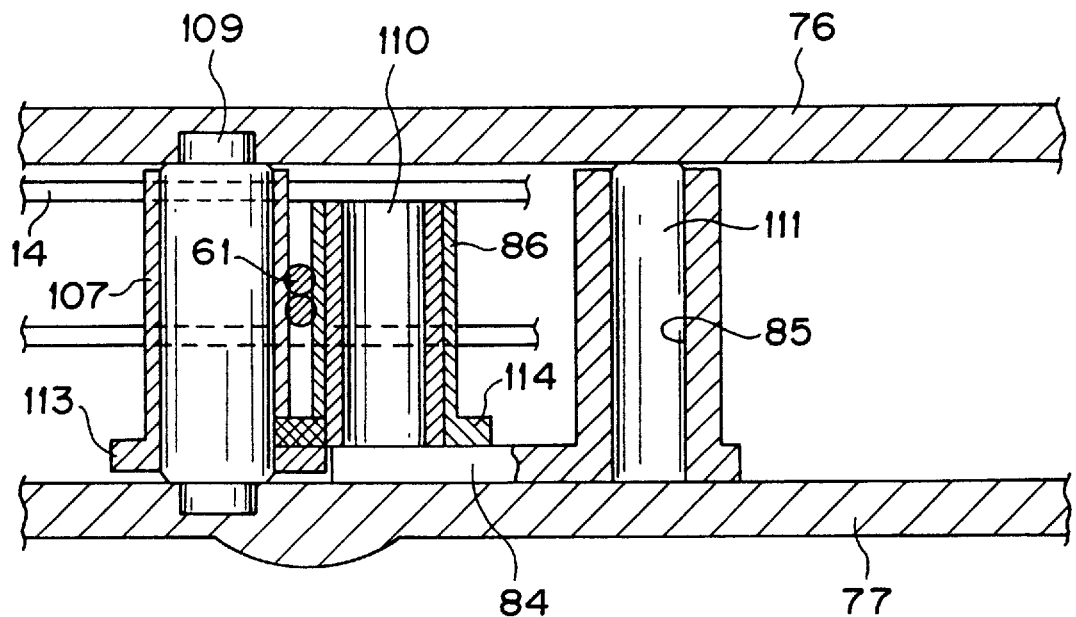
FIG. 18 is a longitudinal cross-sectional view showing an arrangement of the cable pay-out roll.
Figure 19:
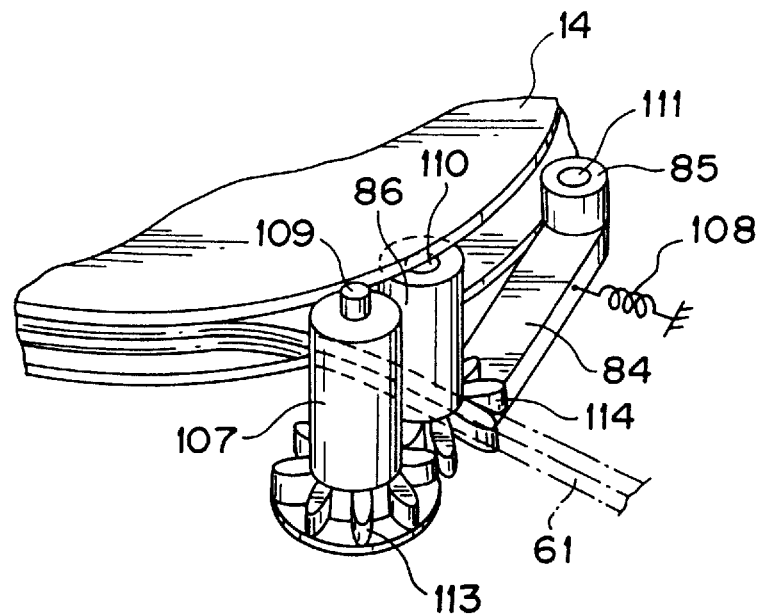
FIG. 19 is a perspective view showing an arrangement of the cable pay-out roll.

The rotary lever 84 is rotated about the supporting shaft 87 for moving the second cable pay-out roll 86 between the position approaching the second cable reel 15 and the position approaching the first cable pay-out roll 107, as shown in FIGS. 16 and 17.

The rotary lever 84 is rotationally biased by a torsion coil spring 94 mounted within the remote controller 4 in a direction of abutting the second cable pay-out roll 86 against the second cable reel 15 as indicated by arrow P in FIG. 17.

The first and second meshing portions 113, 114 are formed at lower end portions of the cable pay-out rolls 107, 86, respectively. The first and second meshing portions 113, 114 are formed with plural equiangularly spaced apart radially extending teeth of the cut gear teeth type longer in length than the teeth of commonplace spur gears.

These first and second meshing portions 113, 114 are kept in the meshing state even if there are formed voids about 1 mm long between the respective cable pay-out rolls 107, 86.

The first cable pay-out roll 107 and the second cable pay-out roll 86 cooperate to clamp the cable bundle 61 extracted from the second cable reel 15.

If at least one of the signal cables of the cable bundle 61 is paid out by being pulled out of the second cable reel 15, the second cable pay-out roll 86 is pulled out by one signal cable for rotating the rotary lever 84 against the bias of the torsion coil spring 94 for drawing the rotary lever 84 to the first cable pay-out roll 107, as shown in FIG. 16.

When the signal cable thus paid out is pulled outwardly of the second cable reel 15, the first and second cable pay-out rolls 107, 86 are rotated in, the reverse directions in synchronism with each other by the meshing of the meshing portions 113, 114, so that an other signal cable of the cable bundle 61 is paid outwardly of the second cable reel 15.

When the cable bundle 61 is taken up on the second cable reel 15, the second cable pay-out roll 86 is displaced away from the first cable pay-out roll 107 by the rotary lever 84 being turned under the bias of the torsion coil spring 94. At this time, the winding of the cable bundle 61 by the second cable reel 15 is not obstructed by the cable pay-out rolls 107, 86.

[8] Holder for Remote Controller

On the outer side of the main body portion 1, a pair of lock bars 24, 24, operating as contacts for first actuating signals, are positioned within the holder 17 for the remote controller 4 and connected to the circuit board of the recording and/or reproducing unit, as shown in FIGS. 1 and 3. These lock bars 24, 24 are arranged facing each other via a pair of through-holes 18, 18 formed on both sides of the holder 17.

Each lock bar 24 is columnar-shaped and has a central reduced-diameter portion 71 and terminal reduced-diameter portions 70, 70 as shown in FIGS. 8 to 11. The lock bars 24, 24 are supported with their axes extending parallel to the bottom surface of the holder 17, and the respective terminal reduced-diameter portions 70, 70 are extended on both sides of the through-holes for being prohibited from being extracted from these through-holes 18, 18.

Figure 10:
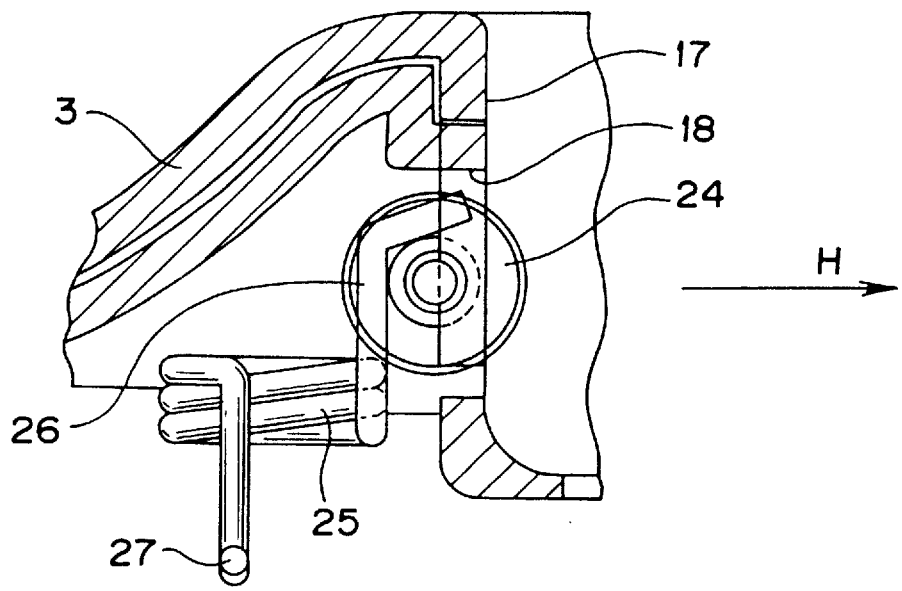
FIG. 10 is a longitudinal cross-sectional view showing essential portions of the outer casing of the main body portion of the tape player device.
Figure 11:
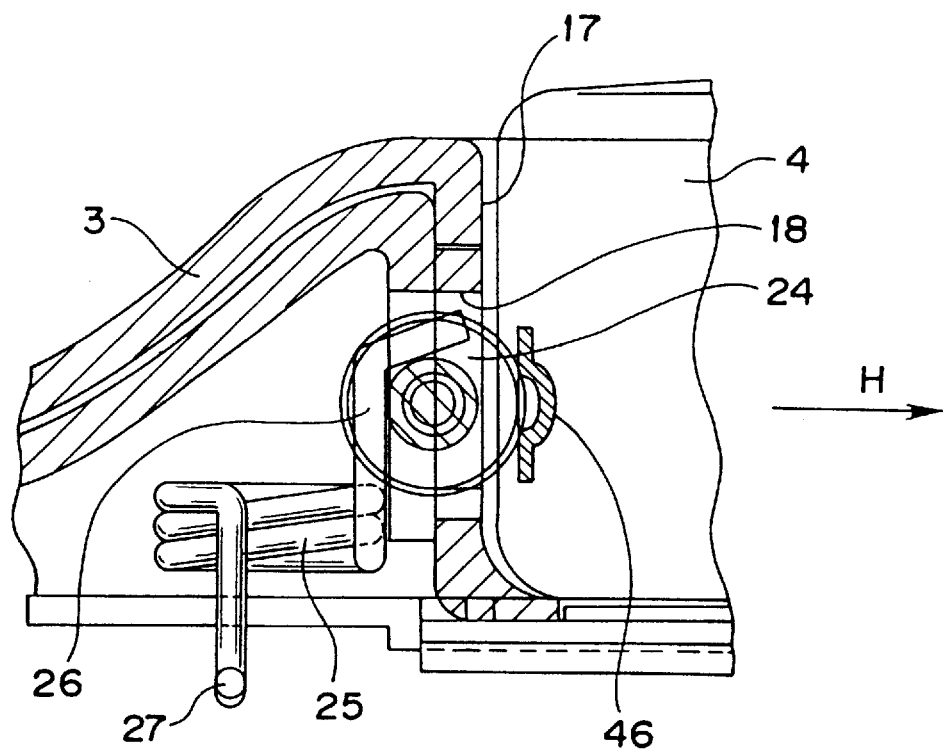
FIG. 11 is a schematic longitudinal cross-sectional view showing the outer casing of the main body portion of the tape player device fitted with the remote controller.

The lock bars 24, 24 are biased into movement towards the inner side of the holder 17, that is in a direction of being protruded outward via through-holes 18, 18, as indicated by arrow H in FIGS. 10 and 11, by a pair of torsion coil springs 25, 25 arranged on the back surface of the front panel 3, as shown in FIGS. 8 to 11. Each of the coil springs 25, 25 has its arm 27 retained by the back surface of the front panel 3, while having its opposite arm 26 abutted against the inner surface of the central reduced-diameter portion 71 of the lock bar 24.

When the remote controller 4 is housed within the holder 17, the lock bars 24, 24 are engaged in groove-shaped recesses of the lock groove members 46, 46 from both lateral sides of the remote controller 4, as shown in FIG. 11.

The remote controller 4 is held at this time in the holder 17 by the lock bars 24, 24.

The remote controller 4 has the lock groove members 46, 46 connected to the lock bars 24, 24 for exchanging operating signals with the circuit board of the recording and/or reproducing unit via these lock groove members 46, 46 and the lock bars 24, 24.

[9] Headphone Holder

Figure 4:
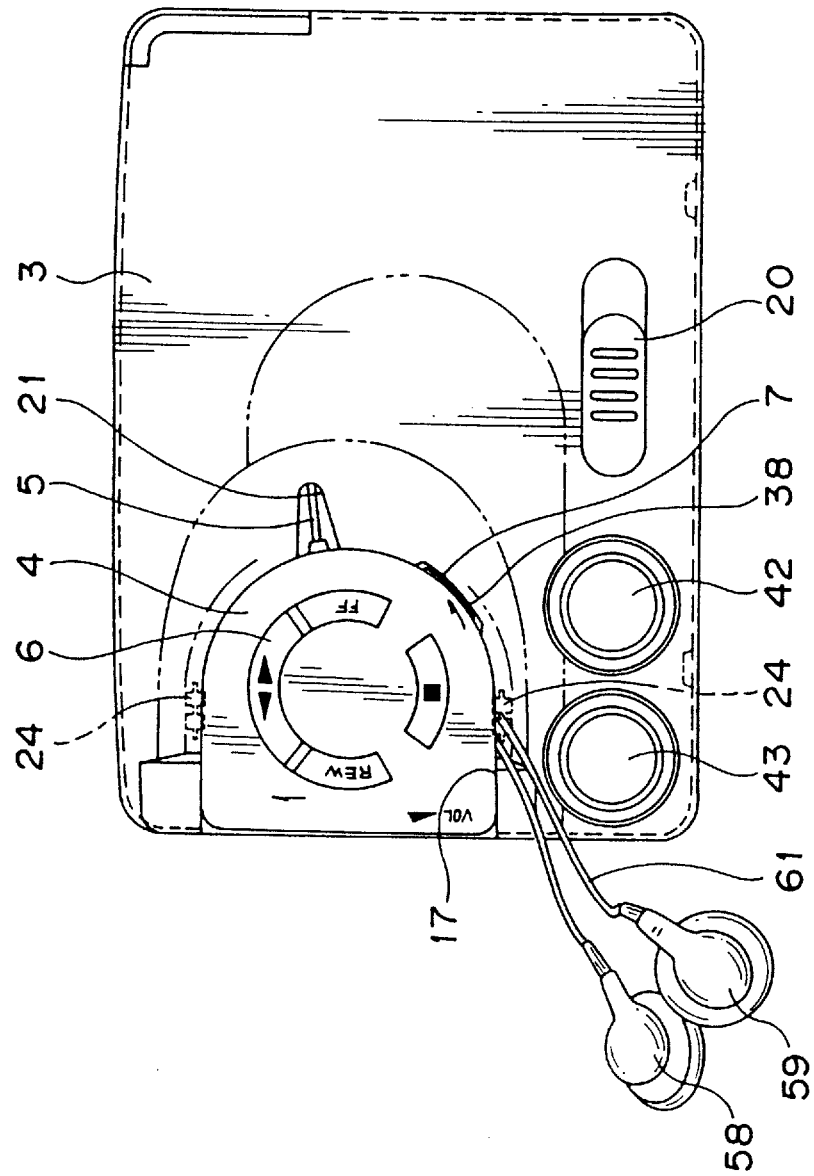
FIG. 4 is a plan view of the tape player device, with a headphone device having been pulled out.

A pair of headphone holders 42, 43 are provided on the front surface of the front panel 3 which is to become the outer lateral side of the main body portion 1, as shown in FIGS. 1 and 4.

The headphone holders 42, 43 are formed by press-working the front panel 3 or bonding a member of a synthetic resin material on the front surface of the front panel 3 in the form of columns of reduced height having the diameters substantially corresponding to those of the unit portions 58, 59, and are protruded towards the front side of the front panel 3.

Figure 13:
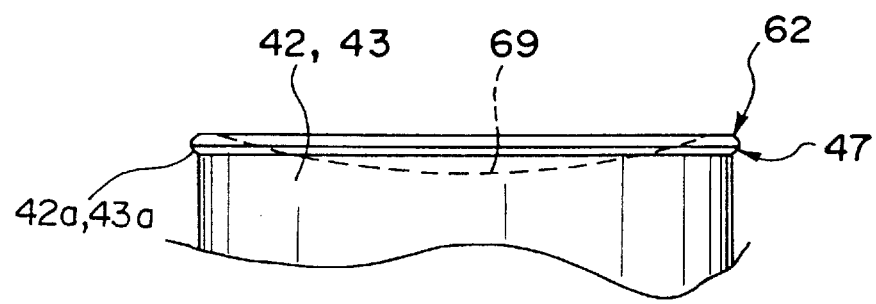
FIG. 13 is a side view showing an arrangement of a holder of the headphone device of the tape player device.

The headphone holders 42, 43 are provided with flanges 42a, 43a extending on the perimeter of the distal end portion as shown in FIG. 13. The front sides and the rear sides of these flanges 42a, 43a are formed as R-surfaces 62 and as C-surfaces 47, respectively. The R-surfaces 62 are toric or constitute part of the spherical surfaces, while the C-surfaces 47 constitute part of the conical surfaces.

The headphone holders 42, 43 present concave surfaces for mating with convex surfaces on the front sides of the speaker unit 68.

Figure 14:
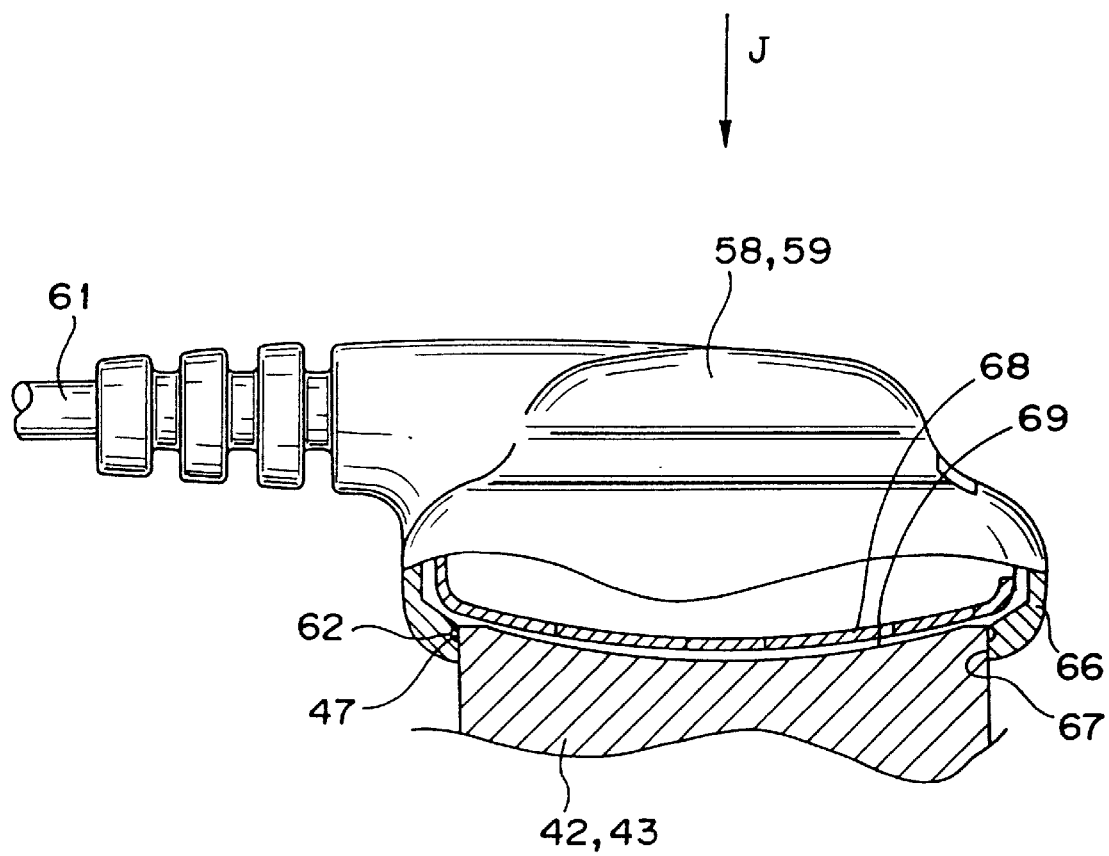
FIG. 14 is a side view showing the state of the unit portion of the headphone device held by the holder of the headphone device.

The headphone holders 42, 43 hold the unit portions 58, 59 by engaging the flanges 42a, 43a within a sound radiating opening 67 of the cover 66, as shown in FIG. 14.

Since the cover 66 of each of the unit portions 58, 59 is formed of a flexible material, the inner periphery of the sound radiating opening 67 is thrust against the flanges 42a, 43a for resiliently deforming the inner periphery of the sound radiating opening for being thereby held by the headphone holders 42, 43.

Thus unit portions 58, 59 are thrust towards the headphone holders 42, 43 as indicated by arrow J in FIG. 14 so as to be held by the headphone holders 42, 43. The unit portions 58, 59 are pulled in a direction of being displaced away from the headphone holders 42, 43, that is in a direction opposite to the arrow J in FIG. 14, so as to be dismounted from the headphone holders 42, 43.

[10] Operation of Tape Player Device

With the above-described tape player device, the remote controller 4 may be held within the holder 17, while the unit portions 58, 59 may be held by the headphone holders 42, 43, as shown in FIG. 3.

The cable engagement slider 20 is actuated at this time for taking up the signal cable 5 on the first cable reel 29 under the bias of the first elastic member 30, while the cable bundle 61 is taken up on the second cable reel 15 under the bias of the second elastic member 16.

With the present tape player device, the unit portions 58, 59 are dismounted and pulled from the headphone holders 42, 43 so that the cable bundle 61 may be pulled out from the second cable reel 15 while the second cable reel 15 is rotated against the bias of the second elastic member 16, as shown in FIG. 4.

If the force of traction on the unit portions 58, 59 is removed in this state, the retention slider 7 is engaged with the second ratchet wheel 14 for inhibiting rotation of the second ratchet wheel 14 under the bias of the second elastic member 16 so that the cable bundle 61 is left in the pulled-out state.

If the cable engagement slider 20 is actuated at this time, the retention slider 7 is actuated via the retention canceling lever 35 for taking up the cable bundle 61 on the second cable reel 15 under the bias of the second elastic member 16.

Figure 5:
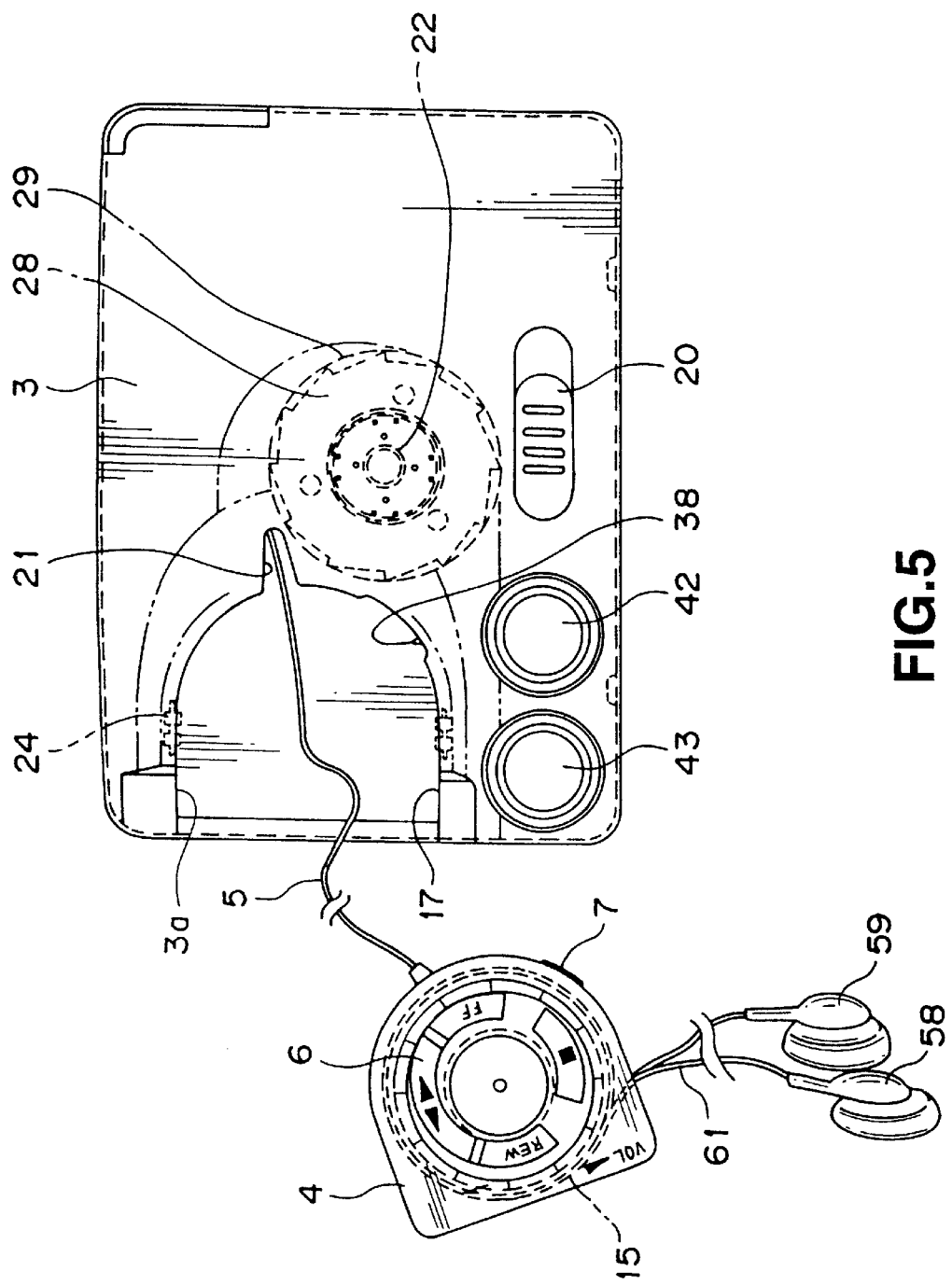
FIG. 5 is a plan view showing the tape player device, with the headphone device and a remote controller having been pulled out.

If, with the present tape player, the remote controller 4 is disengaged from the holder 17 and pulled, as shown in FIG. 5, the signal cable 5 can be pulled out from the first cable reel 29 at the same time as the first cable reel 29 is rotated against the bias of the first elastic member 30.

If the force of traction on the remote controller 4 is removed, the retention lever 31 is engaged with the first ratchet wheel 28 to inhibit rotation of the first ratchet wheel 28 under the bias of the first elastic member 30, with the signal cable 5 then remaining in the pulled-out state.

If the cable engagement slider 20 is actuated at this time, the retention lever 31 is actuated via the retention canceling lever 35, so that the signal cable 5 is taken up on the first cable reel 29 under the bias of the first elastic member 30.

With the present tape player device, if, when the tape cassette is housed within the cassette housing 1a and the cassette lid 135 is abutted against the chassis 2, that is, when the cassette lid 135 closes the cassette housing 1a, the playback switch of the remote controller 4 is actuated, the playback mode of reading out signals from the magnetic tape of the tape cassette is executed.

If the remote controller 4 is held within the holder 17, an actuating signal indicating that the respective switches of the remote controller 4 have been actuated is fed not only to the circuit board of the recording and/or reproducing unit over the signal cable 5, but also to the circuit board of the recording and/or reproducing unit via the lock groove members 46, 46 and the lock bars 24, 24. Thus, in such case, exchange of the actuating signal from the remote controller 4 is not affected by rupture in the signal cable 5.

If the remote controller 4 is dismounted from the holder 17, an actuating signal indicating that the respective switches of the remote controller 4 have been actuated is fed to the circuit board of the recording and/or reproducing unit.

The signals read from the magnetic tape are fed as electrical signals via the recording and/or reproducing unit to the output jack 12 provided on the lateral side of the chassis 2 and the headphone device 57.

The headphone device 57 has its unit portions 58, 59 fed with acoustic signals from the recording and/or reproducing unit via the first and second signal cables 5, 61. The acoustic signals are converted by the speaker units 68, 68 of the unit petitions 58, 59 into audible signals.

The output jack is exposed to the outside via a headphone jack 44 formed in the lateral side of the front panel 3 for connection to a headphone device distinct from the headphone device 57.

During the fast feed and rewind modes, the tape player device is able to promptly locate the playback positions on the magnetic tape by feeding the magnetic tape at a faster rate than the running speed of the magnetic tape during reproduction.

The recording and/or reproducing apparatus of the present invention may be constituted not only as the tape player device as described in the above embodiments but also as e.g., tape recorders, video taper recorders or disc players.

The disc employed as the recording medium in the disc recorder device or in the disc player device may be an information signal recording disc, such as an optical disc, a magnetic disc or a magneto-optical disc.

What is claimed is:

1. A recording and/or reproducing apparatus comprising:
    recording and/or reproducing means;
    a main body portion housing said recording and/or reproducing means;
    an external controller for exchanging signals with said recording and/or reproducing means;
    a flexible conductor interconnecting said external controller and said recording and/or reproducing means, said flexible conductor having one end connected to said external controller and another end connected to a circuit board housed within said main body portion for exchanging signals between said recording and/or reproducing means and said external controller;
    take-up means arranged on said circuit board within said main body portion for taking up said flexible conductor and for housing the flexible conductor thus taken up in said main body portion;
    a headphone including a speaker;
    a second flexible conductor connecting said speaker to said external controller; and
    second take-up means arranged on said external controller for taking up said second flexible conductor and for housing the second flexible conductor thus taken up in said external controller;
    wherein said main body portion includes a housing for housing said external controller and wherein said main body portion includes a terminal portion electrically connected to a portion of said external controller.

2. The recording and/or reproducing apparatus as claimed in claim 1 wherein said take-up means is electrically connected to said circuit board within said main body portion.

3. The recording and/or reproducing apparatus as claimed in claim 2 wherein said take-up means includes a take-up member rotatably supported on said circuit board within said main body portion, said take-up member having an electrode having a sliding contact with an electrically conductive pattern formed on said circuit board within said main body portion.

4. The recording and/or reproducing apparatus as claimed in claim 2 wherein said take-up means includes a take-up member rotatably supported on said circuit board within said main body portion, a biasing member for biasing said take-up member in a direction of taking up said connection means, and an inhibiting mechanism for inhibiting rotation of said take-up member against the bias of said biasing member.

5. The recording and/or reproducing apparatus as claimed in claim 4 wherein said inhibiting mechanism has an engagement member for being engaged with a mating engagement portion of said take-up member, said engagement member being moved between a position of being engaged with said mating engagement portion of said take-up member and a position of being disengaged from said mating engagement portion.

6. A recording and/or reproducing apparatus comprising:

recording and/or reproducing means;

a main body portion housing said recording and/or reproducing means;

an external controller for exchanging signals with said recording and/or reproducing means, said external controller having output means for outputting signals from said recording and/or reproducing means;

a first flexible conductor for supplying said signals to said output means from said recording/reproducing means;

first take-up means for taking up said first flexible conductor;

a headphone including a speaker;

a second flexible conductor interconnecting said external controller and said speaker, said second flexible conductor having one end connected to said speaker and having another end connected to a circuit board housed within said external controller for exchanging signals with said recording and/or reproducing means via said external controller; and second take-up means arranged on said circuit board within said external controller for taking up said second flexible conductor and for housing the second flexible conductor thus taken up in said external controller;

wherein said main body portion has a housing for housing said external controller and wherein the housing of said main body portion includes a second terminal electrically connected to a first terminal portion of said external controller.

7. The recording and/or reproducing apparatus as claimed in claim 6 further comprising:

first inhibiting means provided within said main body portion for inhibiting a take-up operation of said first flexible conductor by said first take-up means;

second inhibiting means provided within said external controller for inhibiting a take-up operation of said second flexible conductor by said second take-up means; and cancellation means for canceling a state of inhibition of the respective take-up operations of said first and second flexible conductors by said first and second take-up means by said first and second inhibiting means in a state in which said external controller is housed within said main body portion.

* * * * *